(12) United States Patent
Shimakawa et al.

(10) Patent No.: US 9,507,339 B2
(45) Date of Patent: Nov. 29, 2016

(54) DISPLAY DEVICE, DISPLAY METHOD, PROGRAM, VIRTUAL MECHANISM LIBRARY, AND COMPUTER READABLE RECORDING MEDIUM

(75) Inventors: Haruna Shimakawa, Kyoto (JP); Kenichiro Mori, Tama (JP)

(73) Assignee: OMRON CORPORATION, Kyoto-shi (JP)

(*) Notice: Subject to any disclaimer, the term of this patent is extended or adjusted under 35 U.S.C. 154(b) by 1033 days.

(21) Appl. No.: 13/635,163

(22) PCT Filed: Jan. 27, 2011

(86) PCT No.: PCT/JP2011/051614
§ 371 (c)(1),
(2), (4) Date: Nov. 26, 2012

(87) PCT Pub. No.: WO2011/114778
PCT Pub. Date: Sep. 22, 2011

(65) Prior Publication Data
US 2013/0066616 A1    Mar. 14, 2013

(30) Foreign Application Priority Data

Mar. 15, 2010  (JP) ................................. 2010-057476

(51) Int. Cl.
*G06G 7/48* (2006.01)
*G05B 19/4068* (2006.01)

(52) U.S. Cl.
CPC . *G05B 19/4068* (2013.01); *G05B 2219/35338* (2013.01); *G05B 2219/35349* (2013.01); *Y02P 90/265* (2015.11)

(58) Field of Classification Search
CPC ................ G05B 19/4068; G05B 2219/35338; G05B 2219/35349; Y02P 90/265
USPC .......................................................... 703/7
See application file for complete search history.

(56) References Cited

U.S. PATENT DOCUMENTS

| | | | |
|---|---|---|---|
| 6,167,328 A | 12/2000 | Takaoka et al. | |
| 6,224,249 B1 | 5/2001 | Ozawa et al. | |

(Continued)

FOREIGN PATENT DOCUMENTS

| | | | |
|---|---|---|---|
| JP | 03-113605 A | 5/1991 | |
| JP | 06-103345 A | 4/1994 | |

(Continued)

OTHER PUBLICATIONS

English Summary of Chinese Office Action dated Apr. 29, 2014 for Chinese Application No. 201180014285.9 (4 pages).

(Continued)

*Primary Examiner* — Kandasamy Thangavelu
*Assistant Examiner* — Andre Pierre Louis
(74) *Attorney, Agent, or Firm* — Nutter McClennen & Fish LLP

(57) ABSTRACT

There is provided a display device which can make the user understand a motion of a control target device without preparing a three-dimensional model faithfully reproducing an outer view of each control target device. A PC (10) as the display device presents options of a virtual mechanism, and accepts a selection thereof. The virtual mechanism has a structure in which a plurality of mechanism elements are combined having interlocking relationships, and includes an abstracted mode not imitating a mode of a specific control target device. The options of the virtual mechanism include a plurality of virtual mechanisms which are mutually different in kind of the mechanism element or in form of the interlocking relationship among the mechanism elements. Using command values or actual measured values of a sequence of positions as execution results of a control program, the PC (10) displays on a screen a moving image showing a state of the selected virtual mechanism in every period when the command value is inputted into the control target device or in a specified period among the periods.

12 Claims, 15 Drawing Sheets

(56) References Cited

U.S. PATENT DOCUMENTS

| | | | |
|---|---|---|---|
| 6,751,526 B2 | 6/2004 | Fujita | |
| 6,768,928 B1 | 7/2004 | Nagasawa et al. | |
| 6,999,841 B1 * | 2/2006 | Rutkowski | G05B 19/408 700/162 |
| 7,002,585 B1 | 2/2006 | Watanabe et al. | |
| 2007/0233452 A1 | 10/2007 | Sasaki | |
| 2008/0091394 A1 | 4/2008 | Hahn et al. | |

FOREIGN PATENT DOCUMENTS

| | | | | |
|---|---|---|---|---|
| JP | 10-254941 A | | 9/1998 | |
| JP | 11-123680 A | | 5/1999 | |
| JP | 2001-034657 A | | 2/2001 | |
| JP | 2001105359 A | | 4/2001 | |
| JP | 2001-216015 A | | 8/2001 | |
| JP | 2001-282331 A | | 10/2001 | |
| JP | 2003-108220 A | | 4/2003 | |
| JP | 2004-259112 A | | 9/2004 | |
| JP | 2006344041 A | * | 12/2006 | ......... G05B 17/4069 |
| JP | 2007-242054 A | | 9/2007 | |
| JP | 2007-265238 A | | 10/2007 | |
| JP | 2008009637 A | * | 1/2008 | ....... G05B 19/40668 |
| JP | 2008-071350 A | | 3/2008 | |
| JP | 2008-100315 A | | 5/2008 | |
| WO | 92/22038 A1 | | 12/1992 | |

OTHER PUBLICATIONS

Japanese Office Action for Application No. 2010-057476 issued May 7, 2013 (3 pages).

International Search Report mailed Apr. 26, 2011 for Application No. PCT/JP2011/051614 (4 Pages).

Okada et al., Interactive 3D software constructive system-intelligentbox. Computer Software. Japan Society for Software Science and Technology. Jul. 17, 1985;12(4):374-84.

* cited by examiner

| | Mechanism element | Shaft direction |
|---|---|---|
| First element | Linear moving element | Global X |
| Second element | Linear moving element | Global Y |

(b)

| | Mechanism element | Shaft direction |
|---|---|---|
| First element | Linear moving element | Global X |
| Second element | Linear moving element | Global Y |
| Third element | Linear moving element | Global Z |

(c)

| | Mechanism element | Shaft direction |
|---|---|---|
| First element | Linear moving element | Global X |
| Second element | Linear moving element | Global Y |
| Third element | Rotational element | Global Y |

(d)

| | Mechanism element | Shaft direction |
|---|---|---|
| First element | Linear moving element | Global X |
| Second element | Linear moving element | Global Y |
| Third element | Linear moving element | Global Z |
| Fourth element | Rotational element | Global Z |

(e)

| | Mechanism element | Shaft direction |
|---|---|---|
| First element | Rotational element | Global Z |
| Second element | Linear moving element | First local X |
| Third element | Linear moving element | First local Y |

(f)

| | Mechanism element | Shaft direction |
|---|---|---|
| First element | Linear moving element | Global X |
| Second element | Rotational element | Global X |
| Third element | Linear moving element | First local X |

(g)

| | Mechanism element | Shaft direction |
|---|---|---|
| First element | Rotational element | Global Z |
| Second element | Arm element | First local X |
| Third element | Rotational element | Global Z |
| Fourth element | Arm element | Second local X |
| Fifth element | Rotational element | Global Z |
| Sixth element | Linear moving element | Global Z |

(h)

| | Mechanism element | Shaft direction |
|---|---|---|
| First element | Rotational element | Global Z |
| Second element | Arm element | Global Z |
| Third element | Arm element | First local X |
| Fourth element | Rotational element | First local X |
| Fifth element | Linear moving element | Second local X |

US 9,507,339 B2

DISPLAY DEVICE, DISPLAY METHOD, PROGRAM, VIRTUAL MECHANISM LIBRARY, AND COMPUTER READABLE RECORDING MEDIUM

TECHNICAL FIELD

The present invention relates to a display device for displaying a motion of a program-controlled control target device as a moving image of a virtual mechanism being an electronically constructed three-dimensional model, a display control method, a program, a computer readable recording medium, a virtual mechanism library which is stored in the display device, and a computer readable recording medium in which the virtual mechanism library is stored.

BACKGROUND ART

There is hitherto known a control program for operating a control target device.

Patent Document 1 describes a simulation device for simulating machining of a workpiece by a machine tool that is operated by the above control program, to display a result of the simulation as a moving image of a three-dimensional model realistically reproducing outer views of the machine tool and the workpiece.

Patent Document 2 discloses a simulation device having a sequencer, a three-dimensional simulator and a display. The sequencer controls equipment by use of a ladder program. The three-dimensional simulator controls a three-dimensional model of the equipment constructed on a three-dimensional virtual space by means of the ladder program of the sequencer, to carry out a simulation of an operation of this three-dimensional model. The display displays the simulated operation of the three-dimensional model. The simulation device uses a real PLC (real Programmable Logic Controller) for actually performing operation control on the equipment as a sequencer, and connects this real PLC to the three-dimensional simulator, to operate the three-dimensional model of the equipment on the virtual space by means of the ladder program of the real PLC.

Patent Document 3 discloses as the control program a programming pendant (teaching device used in a hand-held manner) used for teaching an industrial robot. The programming pendant stores an operation program in which target position data for a robot is described by a movement order. The programming pendant three-dimensionally displays in a graphical manner a trajectory of the distal end of a torch held by a robot arm that moves in accordance with the operation program.

Non-patent Document 1 below discloses a three-dimensional object functional synthesis system (prototype system called "IntelligentBox") capable of constructing an interactive three-dimensional application system by combining and functionally synthesizing three-dimensionally displayed objects having inherent functions.

Patent Document 1: Japanese Unexamined Patent Publication No. 2008-71350
Patent Document 2: Japanese Unexamined Patent Publication No. 2007-265238
Patent Document 3: Japanese Unexamined Patent Publication No. 2007-242054
Non-patent Document 1: "Interactive 3D Software Constructive System—IntelligentBox" written by Okada Yoshihiro and Tanaka Yuzuru, "Computer Software Vol. 12, No. 4, p 374-384" (Jul. 17, 1995), issued by Japan Society for Software Science and Technology

DISCLOSURE OF THE INVENTION

Problems to be Solved by the Invention

Incidentally, for example, in the case of simulating the operation of the program-controlled control target device to display a result of the simulation as in Patent Documents 1, 2, when the three-dimensional model faithfully reproducing the outer view of the control target device for expressing the motion of the control target device, the user can easily understand display contents. Further, the same can also be said for the case of reproducing the operation of the control target device by use of an actual measurement record of the operation of the control target device. However, such a display cannot be performed unless a three dimensional model is made for every control target device. This limits an opportunity to make use of the display by means of the three-dimensional model.

As for a high-priced machine tool and the like, a simulator dedicated to the tool which is capable of performing an operation display by means of a three-dimensional model may be provided from a machinery manufacturer. However, in view of a mechanical device in general, a machinery manufacturer often does not prepare a simulator. Further, when the user designs and produces a mechanical device on his or her own and uses it, a simulator dedicated to the mechanical device is not provided either. Even in such cases, there exists a demand for checking a motion of the control target device by means of a moving image in order to test a program for controlling the motion of the control target device.

However, it is realistically difficult from the aspects of cost and time to prepare the three-dimensional model faithfully reproducing the outer view of the control target device each time the motion of the control target device is wished to be checked by means of the moving image.

The present invention was made in view of the above problem, and has an object to provide a display device, a display method, a program, a virtual mechanism library and a computer readable recording medium, which are capable of making the user understand a motion of a control target device without preparing a three-dimensional model faithfully reproducing an outer view of each control target device.

Means for Solving the Problem

According to one aspect of the present invention, a display device displays on a screen an operation of a control target device, which is operated by an input of a command value of a position outputted by execution of a control program in a predefined period, as a moving image of a virtual mechanism being an electronically constructed three-dimensional model. The display device includes: a virtual mechanism presenting section configured for presenting options of a virtual mechanism on the screen; a virtual mechanism accepting section configured for accepting one selection of the virtual mechanism out of the options of the virtual mechanism presented by the virtual mechanism presenting section; an acquirement unit configured for acquiring command values of a sequence of positions or actual measured values of a sequence of positions as execution results of the control program; a moving image data creating section configured for creating moving image data showing a state of the selected virtual mechanism in every period or in a plurality of predefined periods by use of the acquired command values of the positions or the actual measured values of the positions; and a display controlling section configured for displaying a moving image on the screen by use of the moving image data. The virtual mechanism includes a structure in which a plurality of mechanism elements are combined having interlocking relationships. The virtual mechanism presenting section presents at least a plurality of options of virtual mechanisms which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

Preferably, the virtual mechanism presenting section presents at least options of a virtual mechanism having a linear moving element as the mechanism element. The linear moving element has a columnar linear moving shaft and a movable section that moves along the linear moving shaft. The linear moving element is displayed in a mode where a length of the linear moving shaft remains unchanged from the beginning to the end of reproduction of at least one moving image.

Preferably, the virtual mechanism accepting section further accepts an input for setting a mode of the mechanical element. The input, accepted by the virtual mechanism accepting section for the linear moving element as an essential input for making available the virtual mechanism including the linear moving element, is only an input for setting a movable length of the movable section.

Preferably, the virtual mechanism presenting section presents at least options of a virtual mechanism having a linear moving element as the mechanism element. The linear moving element has a columnar linear moving shaft. The linear moving element is displayed in the mode of changing the length of the linear moving shaft in accordance with a change in command value or actual measured value.

Preferably, the virtual mechanism presenting section presents at least options of a virtual mechanism having a rotational element as the mechanism element. The rotational element is a columnar body that rotates about an axis of symmetry.

Preferably, the virtual mechanism presenting section presents at least options of a virtual mechanism having two linear moving elements perpendicularly connected to each other as the mechanism element and a virtual mechanism having three linear moving elements perpendicularly connected to each other as the mechanism element.

Preferably, the display device further includes: a mechanism element presenting section configured for presenting on the screen options of a mechanism element available for definition of the virtual mechanism; a mechanism element accepting section configured for accepting a selection of mechanism elements connected to each other among the mechanism elements presented as the options, and a specification of an interlocking mode of the selected mechanism elements; and a virtual mechanism creating section configured for creating a virtual mechanism which includes the selected mechanism elements and in which the mechanism elements interlock in a specified form.

Preferably, the display device further includes a storage device that stores a virtual mechanism library including a plurality of mutually different virtual mechanisms. The virtual mechanism presenting section presents options of the virtual mechanism included in the virtual mechanism library.

Preferably, the display device further includes: a storage device that stores a virtual mechanism library including a plurality of mutually different virtual mechanisms and a mechanism element library including at least one mechanism element; and a virtual mechanism registering section configured for registering the virtual mechanism created by the virtual mechanism creating section in the virtual mechanism library. The virtual mechanism presenting section presents options of the virtual mechanism included in the virtual mechanism library. The mechanism element presenting section presents options of the mechanism element included in the mechanism element library.

According to another aspect of the present invention, a display method displays on a screen of a display device an operation of a control target device, which is operated by an input of a command value of a position outputted by execution of a control program in a predefined period, as a moving image of a virtual mechanism being an electronically constructed three-dimensional model. The display method includes the steps of: presenting options of a virtual mechanism on the screen by a processor of the display device; accepting one selection of the virtual mechanism out of the options of the presented virtual mechanism by the processor; acquiring command values of a sequence of positions or actual measured values of a sequence of positions as execution results of the control program by the processor; creating moving image data showing a state of the selected virtual mechanism in every period or in a plurality of predefined periods by use of the acquired command values of the positions or the actual measured values of the positions by the processor; and displaying a moving image on the screen by use of the moving image data by the processor. The virtual mechanism includes a structure in which a plurality of mechanism elements are combined having interlocking relationships. In the step of presenting options of the virtual mechanism on the screen, the processor presents at least a plurality of options of virtual mechanisms which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

According to still another aspect of the present invention, a program makes an operation of a control target device displayed on a screen of a display device, the operation being operated by an input of a command value of a position outputted by execution of a control program in a predefined period, as a moving image of a virtual mechanism being an electronically constructed three-dimensional model. The program makes the display device execute the steps of: presenting options of a virtual mechanism on the screen; accepting one selection of the virtual mechanism out of the options of the presented virtual mechanism; acquiring command values of a sequence of positions or actual measured values of a sequence of positions as execution results of the control program; creating moving image data showing a state of the selected virtual mechanism in each period or in a plurality of predefined periods by use of the acquired command values of the positions or the actual measured values of the positions; and displaying a moving image on the screen by use of the moving image data. The virtual mechanism includes a structure in which a plurality of mechanism elements are combined having interlocking relationships. In the step of presenting options of the virtual mechanism on the screen, at least a plurality of options of virtual mechanisms are presented which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

According to still another aspect of the present invention, a computer readable recording medium stores a program for making an operation of a control target device displayed on a screen of a display device, the operation being operated by an input of a command value of a position outputted by execution of a control program in a predefined period, as a moving image of a virtual mechanism being an electronically constructed three-dimensional model. The program makes the display device execute the steps of: presenting options of a virtual mechanism on the screen; accepting one selection of the virtual mechanism out of the options of the presented virtual mechanism; acquiring command values of a sequence of positions or actual measured values of a sequence of positions as execution results of the control program; creating moving image data showing a state of the selected virtual mechanism in each period or in a plurality of predefined periods by use of the acquired command values of the positions or the actual measured values of the positions; and displaying a moving image on the screen by use of the moving image data. The virtual mechanism includes a structure in which a plurality of mechanism elements are combined having interlocking relationships. In the step of presenting options of the virtual mechanism on the screen, at least a plurality of options of virtual mechanisms are presented which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

According to still another aspect of the present invention, the virtual mechanism library contains a virtual mechanism as an electronically constructed three-dimensional model. The virtual mechanism includes a structure in which a plurality of mechanism elements are combined having interlocking relationships. The virtual mechanism library contains at least a plurality of options of virtual mechanisms which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

Preferably, the virtual mechanism library contains at least a virtual mechanism having two linear moving elements perpendicularly connected to each other as the mechanism element and a virtual mechanism having three linear moving elements perpendicularly connected to each other as the mechanism element.

According to still another aspect of the present invention, a computer readable recording medium stores the virtual mechanism library containing a virtual mechanism as an electronically constructed three-dimensional model. The virtual mechanism includes a structure in which a plurality of mechanism elements is combined having interlocking relationships. The virtual mechanism library contains at least a plurality of options of virtual mechanisms which are mutually different in kind of the mechanism element or in form of the interlocking relationship among the mechanism elements. The virtual mechanism includes an abstracted mode not imitating a mode of a specific control target device that can be associated with the virtual mechanism when the virtual mechanism is used by the user.

Preferably, the virtual mechanism library contains at least a virtual mechanism having two linear moving elements perpendicularly connected to each other as the mechanism element and a virtual mechanism having three linear moving elements perpendicularly connected to each other as the mechanism element.

Effect of the Invention

It is possible to make the user understand a motion of a control target device without preparing a three-dimensional model faithfully reproducing an outer view of each control target device.

BRIEF DESCRIPTION OF THE DRAWINGS

FIG. 19 is a view showing definition information of each of the virtual mechanisms exemplified in FIGS. 8 to 15.

MODE FOR CARRYING OUT THE INVENTION

Figure 1:
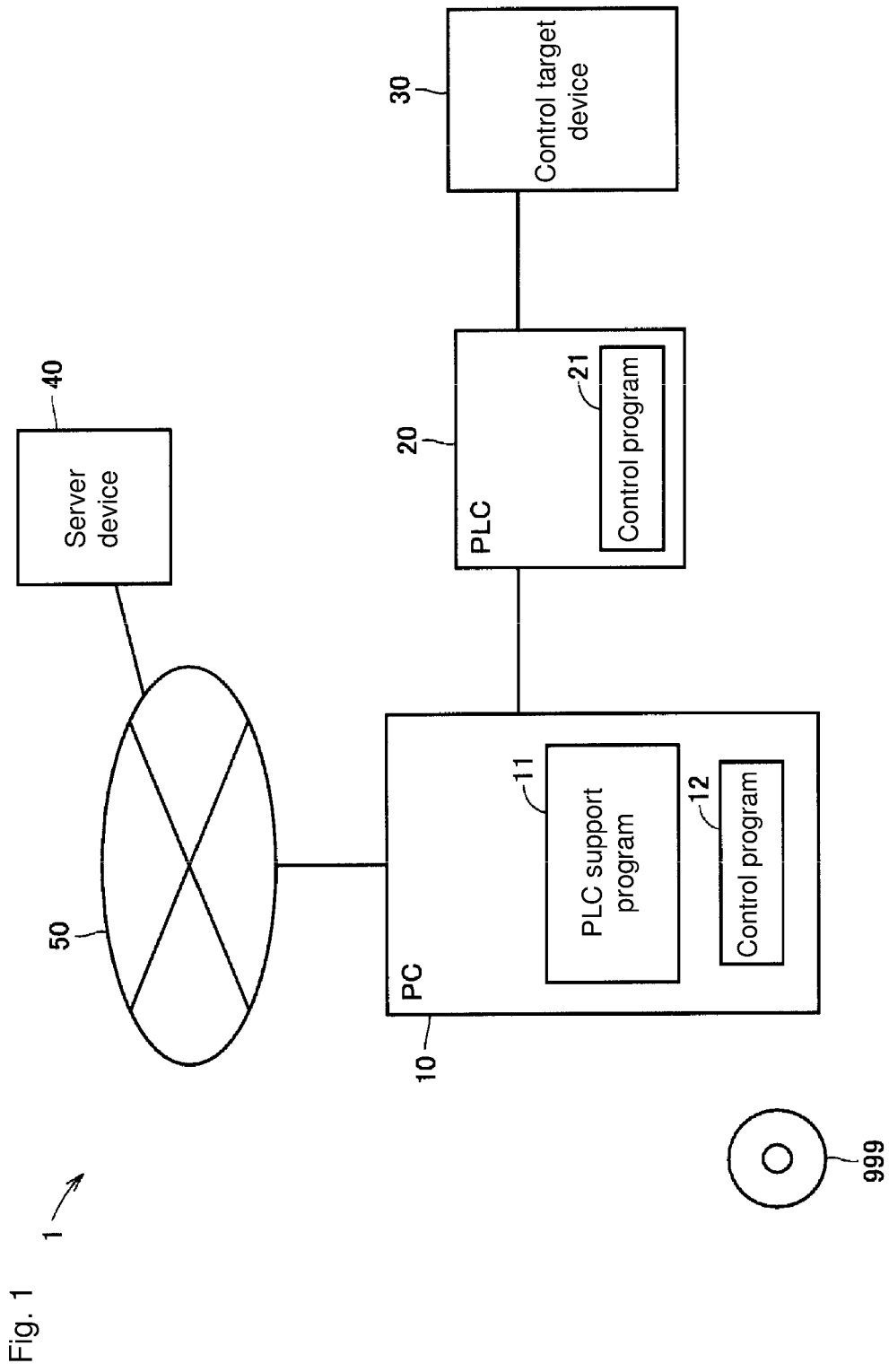
FIG. 1 is a diagram showing a schematic configuration of a control system.

Hereinafter, a display device according to an embodiment of the present invention will be described with reference to the drawings. In the following description, the same reference numerals denote the same components. The names and functions thereof do the same. Therefore, detailed descriptions of such components will not be repeated unnecessarily.

FIG. 1 is a view showing a schematic configuration of a control system 1 according to the presented embodiment.

With reference to FIG. 1, the control system 1 includes a PC (Personal Computer) 10, a PLC (Programmable Logic Controller) 20, a control target device 30, and a server device 40.

The PC (display device) 10 stores an installed PLC support program 11. Further, the PC 10 stores a control program 12 created by the user.

A CD-ROM 999 stores the PLC support program 11. The PLC support program 11 installed in the PC 10 is one installed by use of the CD-ROM 999.

The PLC 20 acts as a controller for controlling a motion of the control target device 30. In other words, the PLC 20 is provided with a so-called motion control function. The PLC 20 stores a control program 21 defining control contents with respect to the control target device 30. The PLC 20 is communicably connected with the PC 10. The control program 21 stored in the PLC 20 is one transmitted from the PC 10. Specifically, the control program 21 is a duplicate of the control program 12 stored in the PC 10.

The control target device 30 includes a motor such as a servo motor or a stepping motor. The control target device 30 is driven by the motor. A drive current is supplied from a motor driver to the motor.

The motor driver is given a command value of a position in every control period from the PLC 20 executing the control program. The motor driver supplies the motor with a drive current corresponding to the command value of the position. When the motor is a servo motor, the motor is provided with an encoder. The encoder detects an actual measured value of a rotational position of the motor. The motor driver uses the actual measured value of the rotational position of the motor for feedback control.

The PC 10 is connectable to the server device 40 through a network 50 such as the Internet. The PLC support program 11 can be downloaded from the server device 40 to the PC 10.

Figure 2:
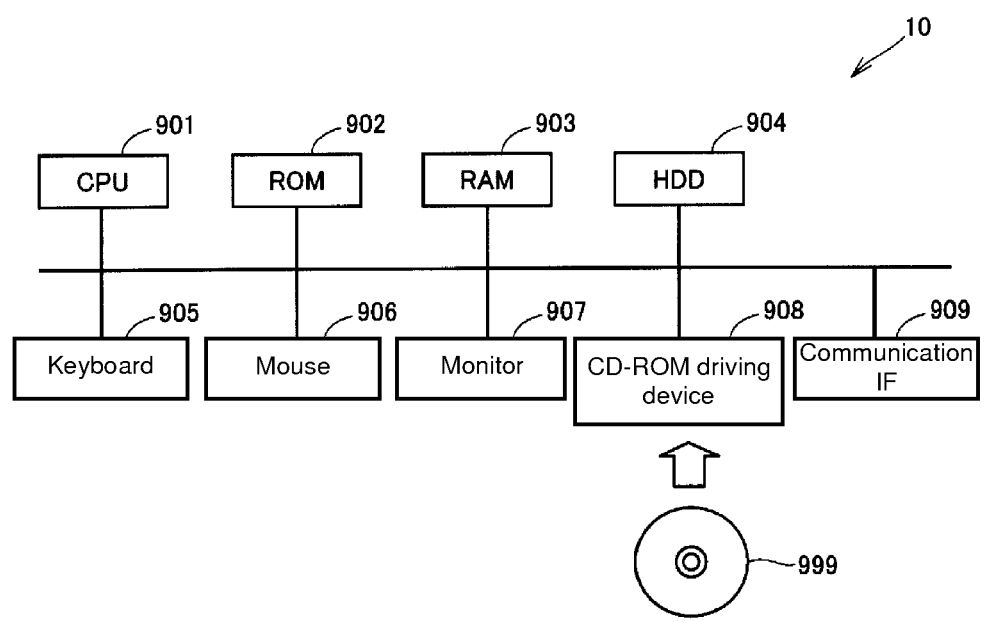
FIG. 2 is a block diagram showing a hardware configuration of a PC.

FIG. 2 is a block diagram showing a hardware configuration of the PC 10. With reference to FIG. 2, the PC 10 includes, as main constitutional elements, a CPU 901 for executing a program, a ROM (Read Only Memory) 902 for storing data in a nonvolatile manner, a RAM 903 for storing in a volatile manner data created by execution of the program by the CPU 901 or data inputted through a keyboard 905 or a mouse 906, a HDD (Hard Disk Drive) 904 for storing data in a nonvolatile manner, the keyboard 905 and the mouse 906 for receiving an input of an instruction by the user of the PC 10, a monitor 907, a CD-ROM driving device 908, and a communication interface (IF) 909. Each constitutional element is connected to each other by a data bus. The CD-ROM 999 is mounted to the CD-ROM driving device 908.

The processes in the PC 10 are realized by software executed by each hardware and the CPU 901. Such software may be previously stored in the HDD 904. The software may also be stored in the CD-ROM 999 or other storage media, and distributed as a program product. Alternatively, the software may be provided as a program product that can be downloaded by an information provider connected to the so-called Internet. Such software is read from the storage medium by the CD-ROM driving device 908 or other reading devices, or downloaded through the communication IF 909, and once stored into the HDD 904. The software is read out from the HDD 904 by the CPU 901 and stored into the RAM 903 in the form of an executable program. The CPU 901 executes the program.

Each constitutional element constituting the PC 10 shown in the figure is a typical one. Hence the essential portion of the present embodiment is the software stored in the RAM 903, the HDD 904, the CD-ROM 999 or other storage medium, or the software that can be downloaded through the network. It is to be noted that, since the operation of each hardware of the PC 10 is well known, a detailed description thereof will not be repeated.

In addition, the recording medium is not limited to a DVD-ROM, a CD-ROM, a FD (Flexible Disk) and hard disk, and may be a medium that fixedly carries the program, such as a magnetic tape, a cassette tape, an optical disc (MO (Magnetic Optical Disc)/MD (Mini Disc)/DVD (Digital Versatile Disc)), an IC (integrated Circuit) card (including a memory card), an optical card, and a semiconductor memory including a mask ROM, an EPROM (Electronically Programmable Read-Only Memory), an EEPROM (Electronically Erasable Programmable Read-Only Memory), and a flash ROM. Further, the recording medium is a non-temporary medium from which the computer can read the program and the like.

The program referred to herein includes not only the program directly executable by the CPU, but also a program in the form of a source program, a compression processed program, a coded program, and the like.

Figure 3:
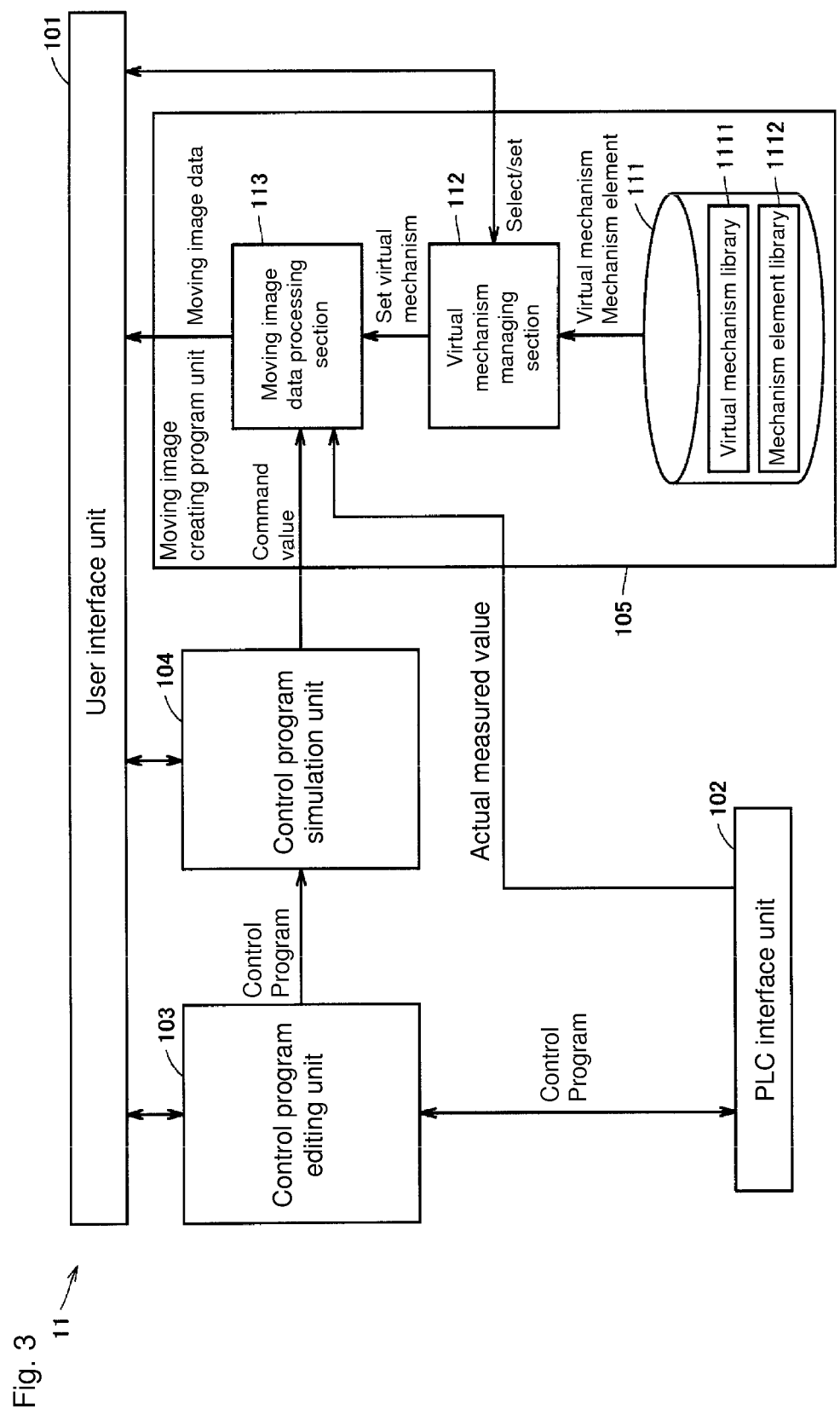
FIG. 3 is a diagram showing a configuration of a PLC support program.

FIG. 3 is a diagram showing a configuration of the PLC support program 11. With reference to FIG. 3, a user interface unit 101, a PLC interface unit 102, a control program editing unit 103, a control program simulation unit 104, and a moving image creating program unit 105 are arranged. The moving image creating program unit 105 includes a library 111, a virtual mechanism managing section 112, and a moving image data processing section 113. The library 111 includes a virtual mechanism library 1111 and a mechanism element library 1112.

Figure 4:
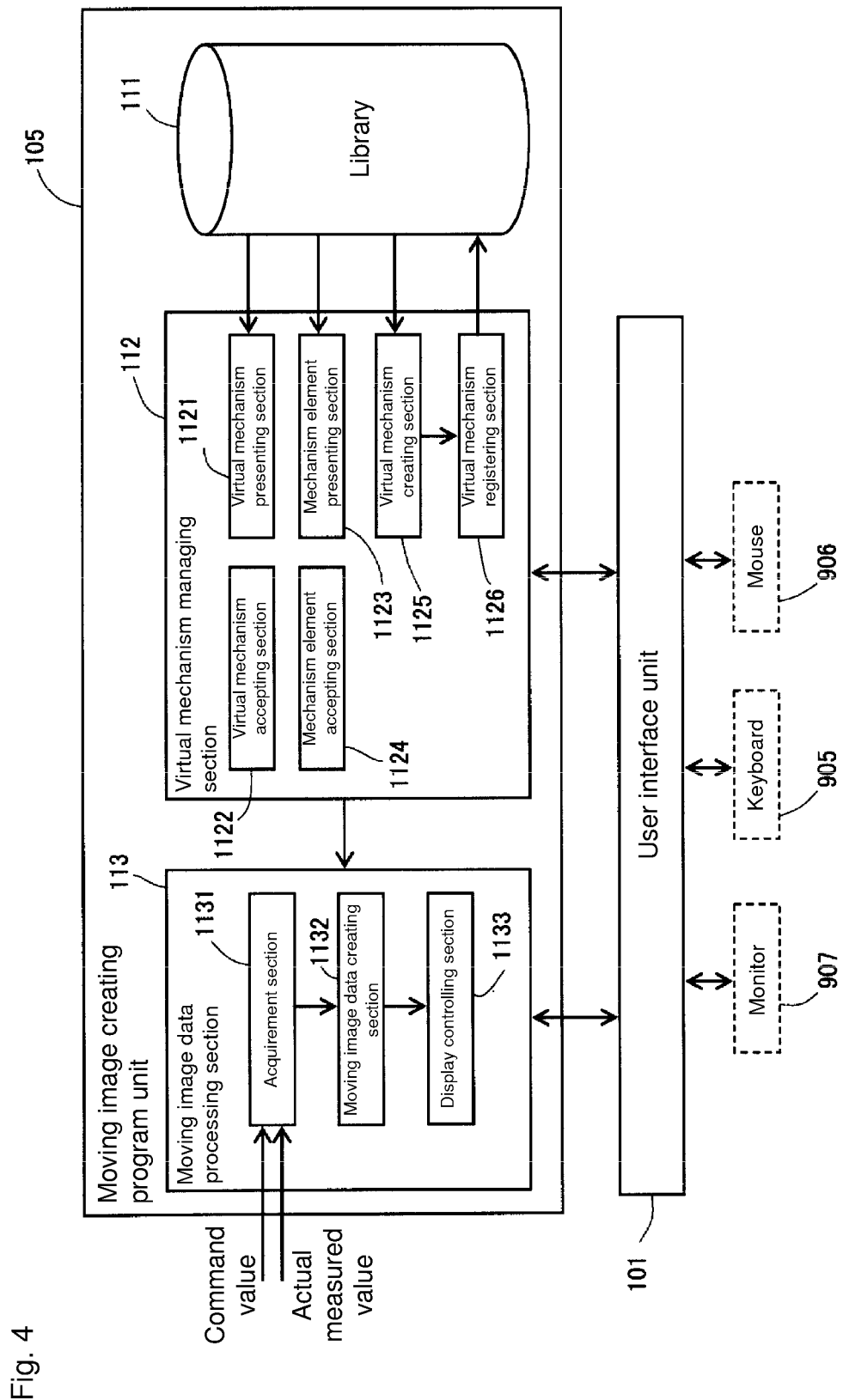
FIG. 4 is a diagram showing a functional configuration of a moving image data processing section and a virtual mechanism managing section which are included in a moving image creating program unit.

The user interface unit 101 creates contents of a window to be displayed on a screen of the PC 10 (screen of the monitor 907). The user interface unit 101 accepts an operation of the user by means of the keyboard and the mouse. A functional configuration of the user interface unit 101 will be described later (FIG. 4).

The control program editing unit 103 inputs and edits the control program in accordance with an instruction accepted from the user. The control program editing unit 103 also performs compiling when compiling is necessary for executing the control program. The control program editing unit 103 transmits the created control program to the PLC 20 through the PLC interface unit 102. The control program editing unit 103 can also read out the control program 21 stored in the PLC 20, and edit the read control program 21.

The control program simulation unit 104 is a simulator of the PLC 20. The control program simulation unit 104 simulates the operation of the PLC 20 executing the control program 21, and calculates a command value of a position that should be outputted by the PLC 20 in every control period.

The virtual mechanism library 1111 includes a plurality of virtual mechanisms. The virtual mechanism is an electronically constructed three-dimensional model. The virtual mechanism is provided with a structure in which a plurality of mechanism elements are combined having interlocking relationships. The virtual mechanism library 1111 contains at least a plurality of virtual mechanisms which are different in kind of the mechanism element or in mode of the interlocking relationship among the mechanism elements. The virtual mechanism is provided with an abstracted mode not imitating a mode of a specific control target device that can be associated with the virtual mechanism when the virtual mechanism is used by the user. That is, the virtual mechanism is designed to be in a simple mode with small individuality so as to be easily used as a model of a variety of control target devices each having a basic structure in common with a basic structure of the virtual mechanism. The basic structure is a structure corresponding to how to combine the mechanism elements. The virtual mechanism library 1111 may include a virtual mechanism in the mode of imitating a mode of a specific control target device in addition to the virtual mechanism in the abstracted mode.

The mechanism element library 1112 contains at least one mechanism element.

The virtual mechanism managing section 112 presents a virtual mechanism prepared in the virtual mechanism library 1111 to the user as an option through the user interface unit 101. The virtual mechanism managing section 112 selects the virtual mechanism in accordance with an instruction accepted from the user. Further, when there are contents to be set by the user for the selected virtual mechanism, the virtual mechanism managing section 112 also accepts such setting through the user interface unit 101.

When the user defines a new virtual mechanism not prepared in the virtual mechanism library 1111, the virtual mechanism managing section 112 presents the mechanism element prepared in the mechanism element library 1112 as an option to the user through the user interface unit 101. The virtual mechanism managing section 112 selects the mechanism element in accordance with an instruction accepted from the user. Further, the virtual mechanism managing section 112 accepts through the user interface unit 101 a specifying operation as to which mechanism element is to be connected to and interlocked with which mechanism element.

The virtual mechanism managing section 112 defines a new virtual mechanism and makes it available based on specified contents from the user, and adds the available virtual mechanism to the virtual mechanism library 1111.

Hereinafter, the PLC support program 11 will be described in more detail.

FIG. 4 is a diagram showing a functional configuration of the moving image data processing section 113 and the virtual mechanism managing section 112 which are included in the moving image creating program unit 105. With reference to FIG. 4, the moving image data processing section 113 is provided with an acquirement section 1131, a moving image data creating section 1132 and a display controlling section 1133. The virtual mechanism managing section 112 includes a virtual mechanism presenting section 1121, a virtual mechanism accepting section 1122, a mechanism element presenting section 1123, a mechanism element accepting section 1124, a virtual mechanism creating section 1125, and a virtual mechanism registering section 1126.

The virtual mechanism presenting section 1121 presents options of the virtual mechanism included in the virtual mechanism library 1111 in the library 111 on the screen of the monitor 907 through the user interface unit 101. The virtual mechanism presenting section 1121 presents at least a plurality of options of virtual mechanisms which are different in kind of the mechanism element or in mode of the interlocking relationship among the mechanism elements.

The virtual mechanism accepting section 1122 accepts one selection among the options of the virtual mechanism presented by the virtual mechanism presenting section 1121. This selection is given by the user operating the keyboard 905 and the mouse 906.

The acquirement section 1131 acquires command values of a sequence of positions as execution results of the control program 12 from the control program simulation unit 104. Further, the acquirement section 1131 acquires actual measured values of a sequence of positions as the execution results of the control program 12 from the PLC interface unit 102.

The moving image data creating section 1132 acquires the virtual mechanism, having been subjected to necessary setting and become available, from the virtual mechanism library 1111 through the virtual mechanism managing section 112. Using the command values of the sequence of positions acquired from the control program simulation unit 104 or actual measured values of the sequence of positions acquired from the PLC interface unit 102, the moving image data creating section 1132 creates moving image data showing a state of the above selected virtual mechanism in every control period or in a plurality of specified control periods. It is to be noted that the "plurality of specified control periods" refer, for example, to a number of control periods extracted with respect to each constant period.

The display controlling section 1133 displays a moving image using the above moving image data on the screen of the monitor 907 through the user interface unit 101. This allows the PC 10 to display the moving image of the selected virtual mechanism.

In the case of defining a new virtual mechanism, the mechanism element presenting section 1123 displays options of the mechanism element, included in the mechanism element library 1112 and available for definition of the virtual mechanism, on the screen of the monitor 907 through the user interface unit 101. The mechanism element accepting section 1124 accepts a selection of mechanism elements connected to each other among the mechanism elements presented as the options, and specification of the form of interlock between the mechanism elements. These selection and specification are given by the user operating the keyboard 905 and the mouse 906.

The virtual mechanism creating section 1125 creates a virtual mechanism which includes the above selected mechanism elements and where the mechanism elements are interlocked in the above specified mode. The virtual mechanism registering section 1126 registers the created virtual mechanism in the virtual mechanism library 1111 of the library 111.

The moving image data processing section 113 obtains the sequence of positions of the specific portion in every control period or in a plurality of specified control periods corresponding to the acquired command value of the position. The moving image data processing section 113 creates trajectory data showing a trajectory that passes through each of the sequence of positions of the specific portion in order of elapse of time. The moving image data creating section 1132 of the moving image data processing section 113 creates moving image data for displaying on the screen a spatial mode of the trajectory as an image based on the trajectory data. The PC 10 may display the moving image in a form where the moving image of the virtual mechanism includes a trajectory of a specific portion.

Figure 5:
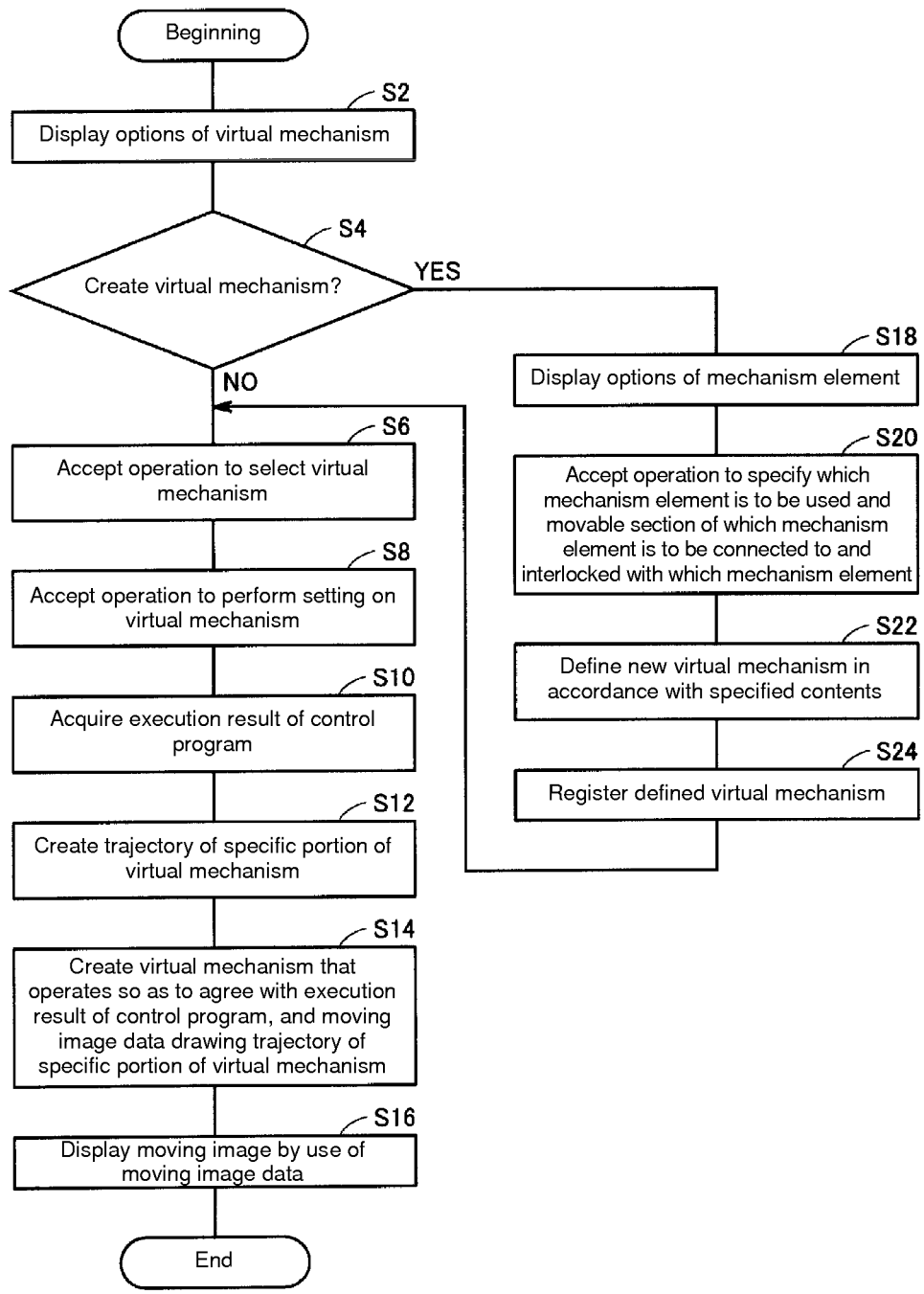
FIG. 5 is a flowchart showing processes performed in the PC based on the PLC support program.

FIG. 5 is a flowchart showing processes performed in the PC 10 based on the PLC support program 11. With reference to FIG. 5, in Step S2, the PC 10 displays options of the virtual mechanism. That is, the virtual mechanism presenting section 1121 displays options of the virtual mechanism on the screen. In Step S4, the moving image creating program unit 105 determines whether or not an instruction to create the virtual mechanism has been accepted through the user interface unit 101.

When it is determined that the instruction has not been accepted (NO in Step S4), the virtual mechanism accepting section 1122 accepts an operation (input) to select the virtual mechanism in Step S6. The virtual mechanism accepting section 1122 transmits an instruction in accordance with the accepted operation to the moving image data processing section 113. In Step S8, the virtual mechanism accepting section 1122 accepts an operation to perform setting on the virtual mechanism. The virtual mechanism accepting section 1122 transmits an instruction in accordance with the accepted operation to the moving image data processing section 113.

In Step S10, the acquirement section 1131 acquires an execution result of a control program. In Step S12, the moving image data processing section 113 creates trajectory data of a specific portion of the virtual mechanism. In Step S12, the moving image data creating section 1132 creates a virtual mechanism that operates so as to agree with the execution result of the control program, and moving image data for displaying on the screen a spatial mode of a trajectory of the specific portion of the virtual mechanism as an image. In Step S16, the PC 10 displays a moving image by use of the created moving image data.

When it is determined that the instruction has been accepted (YES in Step S4), the PC 10 displays options of the mechanism element in Step S18. That is, the mechanism element presenting section 1123 displays on the screen at least one mechanism element available for definition of the virtual mechanism. In Step S20, the mechanism element accepting section 1124 accepts an operation to specify a mechanism element to be used and specify a movable section of a mechanism element to be connected and interlocked with another mechanism element. That is, the mechanism element accepting section 1124 accepts a selection of mechanism elements connected to each other among the displayed mechanism elements, and specification of the form of interlock between the selected mechanism elements.

In Step S22, the virtual mechanism creating section 1125 defines a new virtual mechanism in accordance with specified contents. That is, the virtual mechanism creating section 1125 creates a virtual mechanism which includes the above selected mechanism elements and where the mechanism elements are interlocked in the above specified mode. In Step S24, the virtual mechanism registering section 1126 registers the defined (created) virtual mechanism in the virtual mechanism library 1111.

Figure 6:
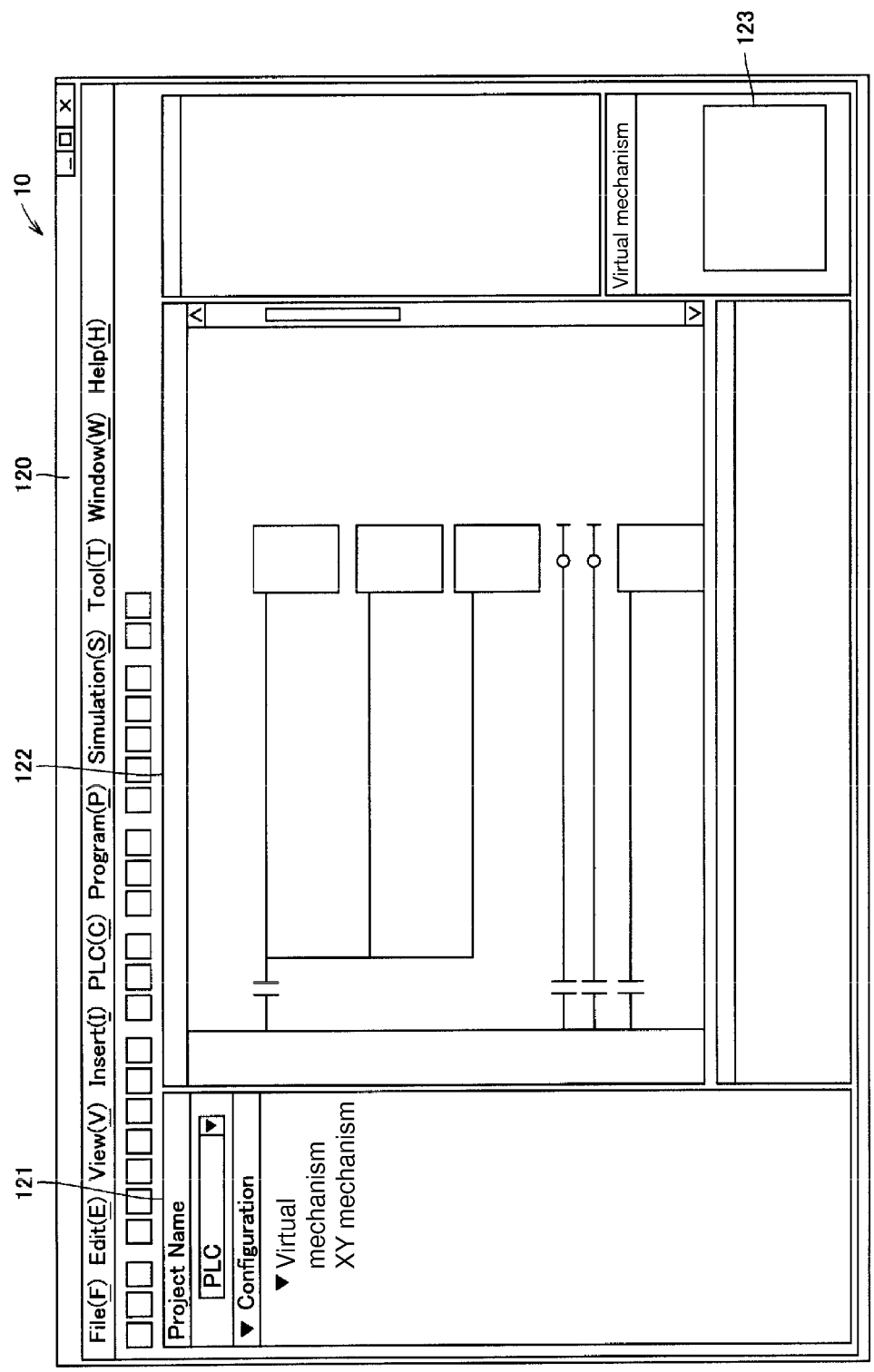
FIG. 6 is a view showing a window which is displayed on the PC when the PLC support program is executed.

FIG. 6 is a view showing a window 120 displayed on the PC 10 at the time of execution of the PLC support program 11. With reference to FIG. 6, the window 120 includes a setting region 121, a control program editing region 122, and an image display link region 123.

The setting region 121 is a region for inputting a variety of setting required in performing editing and simulation of the control program 12. When the user selects (e.g., clicks) characters "virtual mechanism" included in the setting region 121, the PC 10 opens a window for selecting a virtual mechanism (see FIG. 7) as another window. Characters "XY mechanism" indicate that the currently selected virtual mechanism is an XY mechanism.

The control program editing region 122 is used for the user to input the control program or to edit the control program.

When the user selects the image display link region 123, the PC 10 opens an image display screen (FIG. 17) as another window.

Figure 7:
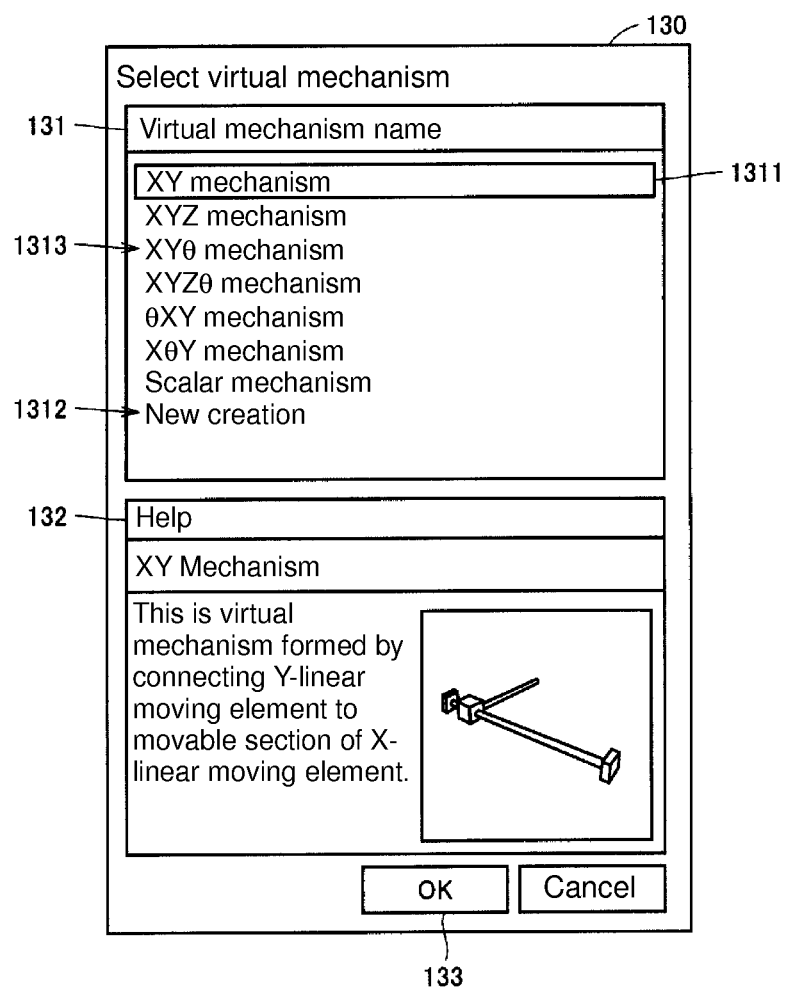
FIG. 7 is a view showing a window for selecting the virtual mechanism.

FIG. 7 is a view showing a window 130 for selecting the virtual mechanism. FIG. 7 also shows the image outputted to the screen of the PC 10 by execution of the PLC support program 11. With reference to FIG. 7, the window 130 includes a region 131 showing a virtual mechanism name, a region 132 showing a help, and a region 133 showing an OK button.

The PC 10 displays a list of available virtual mechanism in the regions 131 showing the virtual mechanism name. When one of the virtual mechanism names is clicked by the user, the PC 10 brings the clicked virtual mechanism into a selected state. FIG. 7 shows a state where the XY mechanism 1311 surrounded by a rectangle is selected. When the user pushes the OK button in this state, the selection of the XY mechanism is confirmed. When the selected virtual mechanism requires an input of setting information, the PC 10 opens a virtual mechanism setting screen (FIG. 16) as another window.

The PC 10 displays a description on the selected virtual mechanism in the region showing a help.

When a region 1312 of "new creation" of the region 131 showing the virtual mechanism name is selected and the selection is confirmed, the PC 10 opens a new virtual mechanism creating screen as another window. This allows the user to define a new virtual mechanism.

Next, eight examples of the virtual mechanism are shown based on FIGS. 8 to 15. In addition, each virtual mechanism is configured of a plurality of elements (mechanism elements). Further, when "n" is a natural number not smaller than 1, it is assumed that an (n+1)th element depends on an nth element. That is, a certain element directly depends on an element whose ordinal number is only one smaller than that of its own. For example, a second element directly depends on a first element. A third element directly depends on a second element, and indirectly depends on the first element by means of the second element.

Figure 8:
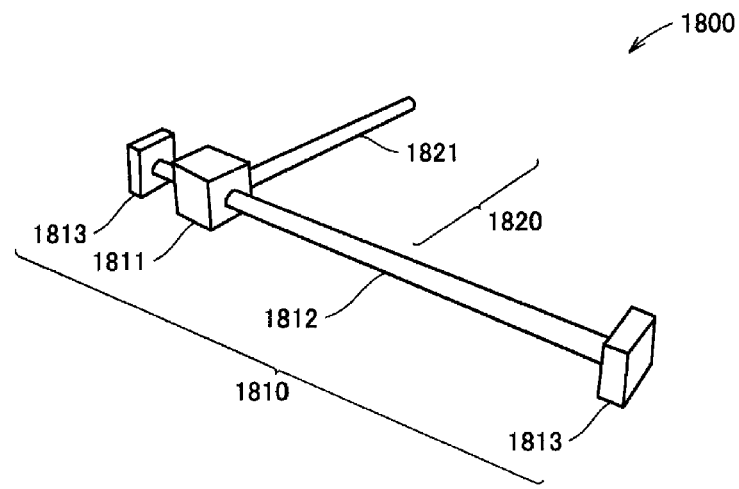
FIG. 8 is a view showing a first virtual mechanism.

FIG. 8 shows a first virtual mechanism. More specifically, FIG. 8 is a view showing an XY mechanism 1800. With reference to FIG. 8, the XY mechanism 1800 has a linear moving element 1810 in an X direction as the first element, and a linear moving element 1820 in a Y direction as the second element which interlocks with the first element.

The linear moving element 1810 is displayed in the mode of including a cylindrical linear moving shaft 1812 and a cubic movable section 1811 that moves along the linear moving shaft 1812. A cross-sectional shape of the linear moving shaft 1812 is not limited to a circle, and a rectangle or other arbitrary shapes can be applied. In addition, it is similar to each linear moving shaft, to be described later. A platy terminating member 1813 vertical to the linear moving shaft is provided at each end of the linear moving shaft 1812.

A movable length is set to the linear moving element 1810. The linear moving shaft 1812 is displayed as a shaft having such a length as to allow the movable section 1811 to move just the movable length. A length of the linear moving shaft 1812 is constant until the setting of the movable length is changed. Hence the length of the linear moving shaft 1812 is constant at least from the beginning to the end of one moving image.

Only the movable length is essential setting information of the linear moving element 1810. When only the movable length is set, the moving image data processing section 113 regards a minimum position in the X direction as zero.

In place of setting the movable length in the X direction, the PLC support program 11 may be configured such that a maximum value and a minimum value of a movable range in the X direction are inputted by the user. In this case, a difference between the maximum value and a minimum value is the movable length.

It is to be noted that, when a length of the linear moving shaft is not made constant, the setting of the movable length in the X direction may be omitted. In this case, there can be considered a display mode in which a movable section is provided at the distal end of the expanding/contracting linear moving shaft or a display mode in which the movable section is also omitted and a basal end section of the linear moving element in the Y direction is directly connected to the distal end of the expanding/contracting linear moving shaft. In these cases, the terminating member 1813 of the linear moving element in the X direction is displayed only on the basal end side. Further, as another display mode at the time of omitting the setting of the movable length of the linear moving element, the linear moving shaft can be made limitlessly long or practically sufficiently long. In these cases, the length of the linear moving element is not held within the screen of the moving image display, and hence the end of the linear moving element is not shown within the screen. Alternatively, the PLC support program 11 may be configured such that a linear moving shaft with an appropriate length is drawn at the beginning of reproducing the moving image and whenever the length becomes insufficient, the display mode is changed so as to set the display length to a necessary length. In the PLC support program 11, when a minimum value and a maximum value of the position in the X direction which should be displayed can be acquired before the beginning of display of the moving image, a difference between the minimum value and the maximum value may be automatically set as the movable length.

The linear moving element 1820 is displayed in the mode of a cylindrical linear moving shaft 1821 whose length expands/contracts in accordance with a change in command value in the Y direction or actual measured value in the Y direction. The basal end of the linear moving element 1820 in the Y direction is connected to the movable section 1811 of the linear moving element 1810. Thereby, the entire linear moving element 1820 moves in the X direction in accordance with movement of the movable section 1811 of the linear moving element 1810. It is to be noted that the moving image data creating section 1132 creates moving image data that changes the length of the linear moving shaft.

Although the user can also set the movable length to the linear moving element 1820, the setting is not essential. In the case of the movable length having been set, even when a position in the Y direction which exceeds the movable length is given, the change in length of the linear moving shaft 1821 is stopped at the position of limit for the movable length.

When the linear moving shaft 1821 is given a negative position value, it is displayed so as to expand in a negative Y direction. The distal end position of the linear moving shaft 1821 shows an XY coordinate of a given position.

In the present embodiment, the linear moving element in the case of another linear moving element directly or indirectly depending thereon is displayed in the mode of including the terminating member at the end not connected with another element. Further, the linear moving element on which another linear moving element does not directly or indirectly depend is displayed in an expandable columnar mode not including the terminating member. In addition, the displays of the terminating members may all be omitted.

The core of the display mode of the linear moving element is a line segment whose length changes in accordance with a value of a given position. This line segment does not have a thickness. When the movable length is set, a line segment having a movable length is subsidiarily added. Alternatively, when the movable length is set, the line segment having the movable length and a point, which is the core of the movable section, moves on the line segment and has no size, may be taken as the core of the linear moving element. When a second linear moving element is connected to a first linear moving element, the basal end of the line segment as the core of the second linear moving element is connected to the distal end of the expanding/contracting line segment as the core of the first linear moving element (or to the point as the core of the movable section). The shaft having a cross-sectional shape, the movable section and the terminating member are modified elements with respect to line segment as the core of the display mode. Since the PLC support program 11 is configured to place little significance on the modified element behaving in a physically realistic manner, even when the modified elements interfere with each other, the PLC support program 11 performs a superimposed display of the modified elements without considering the interference.

Design of the moving image creating program unit 105 becomes easy when performed based on the core of the display mode as thus described. However, the moving image creating program unit 105 may be designed such that the entire displayed mode behaves in a physically realistic manner.

Figure 9:
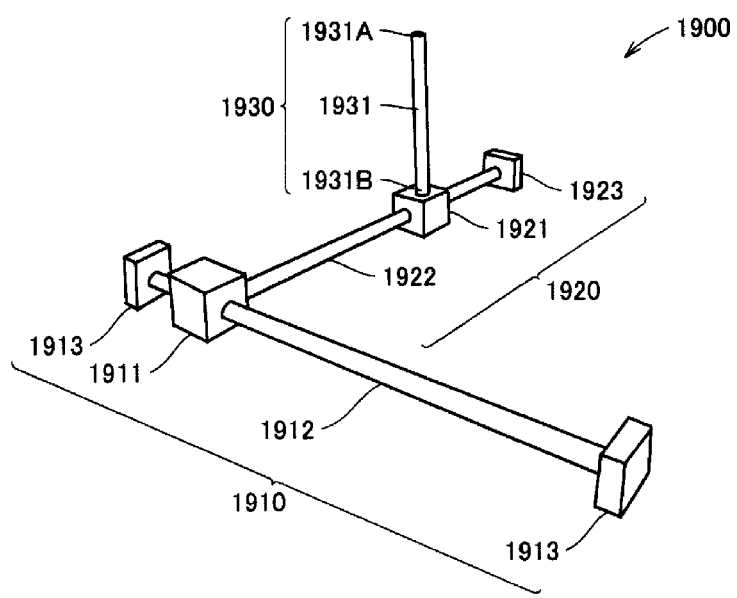
FIG. 9 is a view showing a second virtual mechanism.

FIG. 9 is a view showing a second virtual mechanism. More specifically, FIG. 9 is a view showing an XYZ mechanism 1900. With reference to FIG. 9, the XYZ mechanism 1900 has a linear moving element 1910 in the X direction as the first element, a linear moving element 1920 in the Y direction as the second element which interlocks with the first element, and a linear moving element 1930 in a Z direction as the third element which interlocks with the second element.

The linear moving element 1910 includes a movable section 1911, a linear moving shaft 1912, and a terminating member 1913. Since the linear moving element 1910 has the same configuration as the linear moving element 1810 (FIG. 8), a description of the linear moving element 1910 will not be repeated.

The linear moving element 1920 is displayed in the mode including a cylindrical linear moving shaft 1922 and a cubic movable section 1921 that moves along the linear moving shaft 1922. A cross-sectional shape of the linear moving shaft 1922 is not limited to a circle, and a rectangle or other arbitrary shapes can be applied. A platy terminating member 1923 vertical to the linear moving shaft 1922 is provided at the end (distal end) on the opposite side to the movable section 1911 of the linear moving shaft 1922.

The linear moving element 1930 is displayed in the mode of a cylindrical linear moving shaft 1931 whose length expands/contracts in accordance with a change in command value in a Z direction or actual measured value in the Z direction. A basal end 1931B on the opposite side to a distal end 1931A of the linear moving element 1930 is connected to the movable section 1921.

Figure 10:
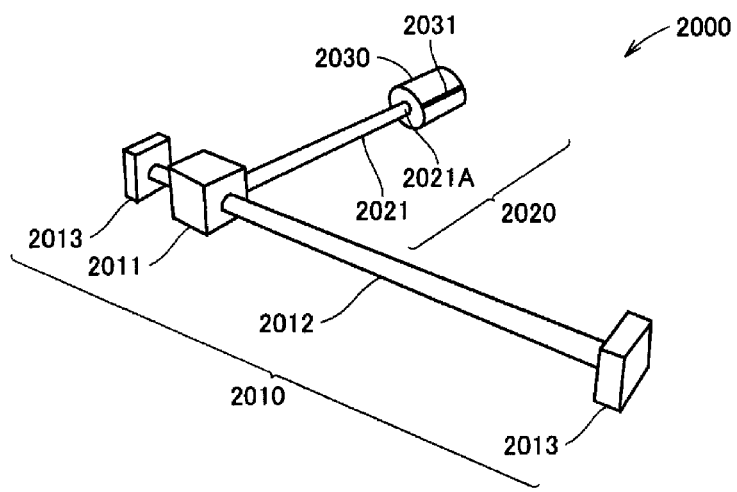
FIG. 10 is a view showing a third virtual mechanism.

FIG. 10 is a view showing a third virtual mechanism. More specifically, FIG. 10 is a view showing an XYθ mechanism 2000. With reference to FIG. 10, the XYθ mechanism 2000 has a linear moving element 2010 in the X direction as the first element, a linear moving element 2020 in the Y direction as the second element which interlocks with the first element, and a rotational element 2030 whose rotational shaft is turned in the Y direction as the third element which interlocks with the second element.

The linear moving element 2010 includes a movable section 2011, a linear moving shaft 2012, and a terminating member 2013. Since the linear moving element 2010 has the same configuration as the linear moving element 1810 (FIG. 8), a description of the linear moving element 2010 will not be repeated.

The linear moving element 2020 is displayed in the mode of a cylindrical linear moving shaft 2021 whose length expands/contracts in accordance with a change in command value in the Y direction or actual measured value in the Y direction. That is, the linear moving element 2020 has a similar configuration to the linear moving element 1820 (FIG. 8).

The rotational element 2030 is displayed in the mode of a cylinder having a larger thickness and a smaller length in a shaft direction (Y direction) than the linear moving shaft 2021. A center position of this cylinder shows an XY coordinate of a given position. A linear mark 2031 parallel to the shaft is displayed on the side surface of the cylinder. The user can see the rotational element 2030 rotating due to movement of the mark 2031.

The core of the display mode of the rotational element 2030 is a center point, and a cylindrical shape is a modified element with respect to the center point. The center point has an attribute in a direction of the rotational shaft and an attribute in a reference radius direction which is vertical to the shaft and rotates in association with rotation of the rotational element. The mark 2031 displayed on the side surface of the cylinder shows the reference radial direction.

In addition, although the shape of the rotational element 2030 was described above as the cylinder, the shape may have a cross section of a polygonal columnar body or a spherical body.

Figure 11:
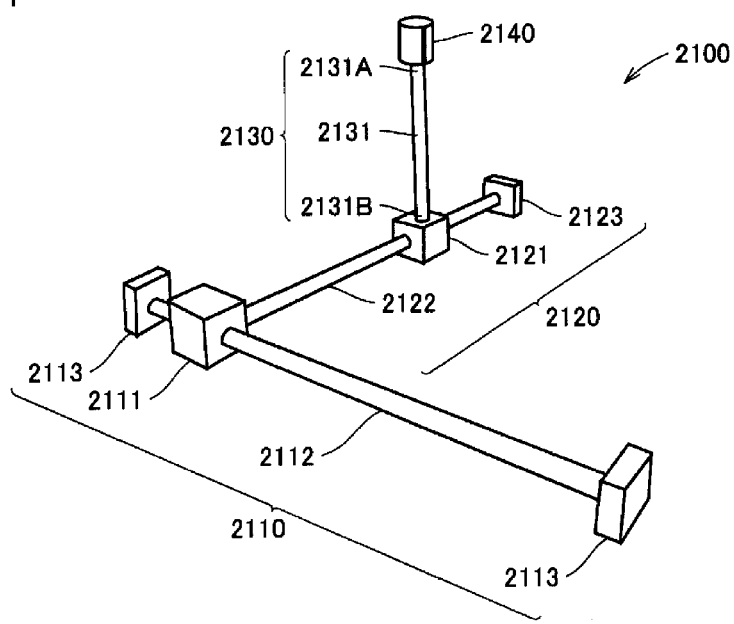
FIG. 11 is a view showing a fourth virtual mechanism.

FIG. 11 is a view showing a fourth virtual mechanism. More specifically, FIG. 11 is a view showing an XYZθ mechanism 2100. With reference to FIG. 11, the XYZθ mechanism 2100 has a linear moving element 2110 in the X direction as the first element, a linear moving element 2120 in the Y direction as the second element which interlocks with the first element, a linear moving element 2130 in the Y direction as the third element which interlocks with the second element, and a rotational element 2140 whose rotational shaft is turned in the Z direction as a fourth element which interlocks with the third element.

The linear moving element 2110 includes a movable section 2111, a linear moving shaft 2112, and a terminating member 2113. Since the linear moving element 2110 has the same configuration as the linear moving element 1810 (FIG. 8), a description of the linear moving element 2110 will not be repeated.

The linear moving element 2120 includes a movable section 2121, a linear moving shaft 2122, and a terminating member 2123. Since the linear moving element 2120 has the same configuration as the linear moving element 1920 (FIG. 9), a description of the linear moving element 2120 will not be repeated.

The linear moving element 2130 is displayed in the mode of a cylindrical linear moving shaft 2131 whose length expands/contracts in accordance with a change in command value in the Z direction or actual measured value in the Z direction. That is, it has a similar configuration to the linear moving element 1930 (FIG. 9). A basal end 2131B of the linear moving element 2130 is connected to the movable section 2121.

The rotational element 2140 is connected to a distal end 2131A of the rotational element 2130. The rotational element 2140 has a similar configuration to the rotational element 2030 (FIG. 10) except that the rotational shaft is turned in the Z direction.

Figure 12:
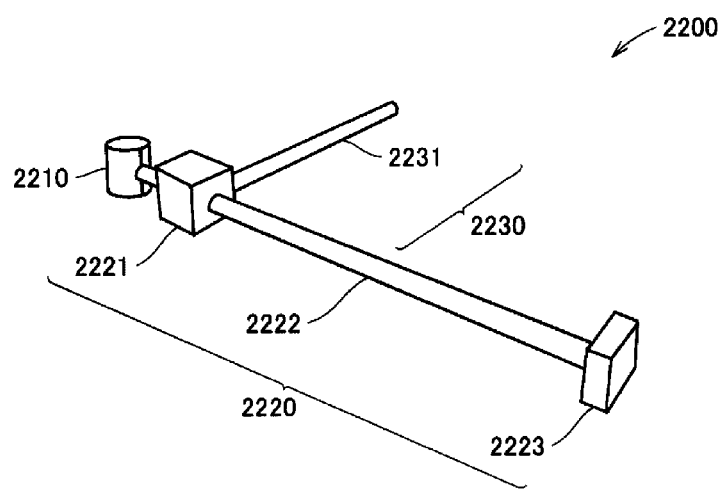
FIG. 12 is a view showing a fifth virtual mechanism.

FIG. 12 is a view showing a fifth virtual mechanism. More specifically, FIG. 12 is a view showing a θXY mechanism 2200. With reference to FIG. 12, the θXY mechanism 2200 has a rotational element 2210 whose rotational shaft is turned in the Z direction as the first element, a linear moving element 2220 in the X direction as the second element which interlocks with the first element, and a linear moving element 2230 in the Y direction as the third element which interlocks with the second element. That is, the θXY mechanism 2200 is a virtual mechanism in which the XY mechanism is made dependent on the rotational element 2210.

It is to be noted that the linear moving element 2220 is provided with a movable section 2221, a linear moving shaft 2222, and a terminating member 2223. The linear moving element 2220 has a similar configuration to the linear moving element 1810 (FIG. 8) except that one end of the linear moving shaft 2222 is connected to the rotational element 2210. The linear moving element 2230 is provided with a linear moving shaft 2231. The linear moving element 2230 has a similar configuration to the linear moving element 1820 (FIG. 8).

Incidentally, the X direction, the Y direction and the Z direction in FIGS. 8 to 11 are directions in a global coordinate system of the entire space in which the control target device 30 is placed. As opposed to this, the X direction, the Y direction and the Z direction in FIG. 12 are directions in a local coordinate system dependent on the rotational shaft of the rotational element 2210.

In a portion dependent on a rotational element having the highest dependent level (i.e., an ordinal number of the element (mechanism element) is small) among the rotational elements included in one virtual mechanism, a first local X direction is defined so as to agree with the reference radius direction. Further, a first local Z direction is defined so as to agree with a direction of the rotational shaft of the rotational element. A first local Y direction is defined as a direction orthogonal to the first local X and the first local Z. An origin of a first local coordinate system agrees with the center of the rotational element. In a portion dependent on a rotational element having the second highest dependent level (rotational element having a higher level than any other rotational elements except for only one rotational element) among the rotational elements, a second local coordinate system is defined in a similar manner as above. It is to be noted that, when the position (rotational angle) given to the first element is zero, the first local X direction is turned in a global X direction (X-axis direction in the global coordinate system).

How to define the local X direction at the time of the position (rotational angle) of the rotational element 2210 being zero within a vertical plane to the rotational shaft of the rotational element 2210 is a matter that can be arbitrarily designed not exclusively to the above. In the present embodiment, in each virtual mechanism, the local X direction is defined in a direction that may be felt by the user as a most natural one. When the given position (rotational angle) increases, the rotational element 2210 rotates counterclockwise as seen from the negative side of the local Z direction defined by the rotational element 2210.

Figure 13:
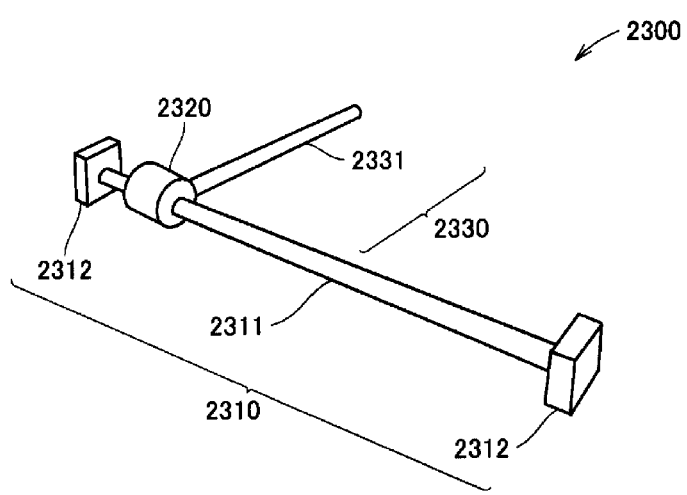
FIG. 13 is a view showing a sixth virtual mechanism.

FIG. 13 is a view showing a sixth virtual mechanism. More specifically, FIG. 13 is a view showing an XθY mechanism 2300. With reference to FIG. 13, the XθY mechanism 2300 has a linear moving element 2310 in the X direction as the first element, a rotational element 2320 whose rotational shaft is turned in the X direction as the second element, and a linear moving element 2330 as the third element which interlocks with the second element.

The linear moving element 2310 includes a linear moving shaft 2311 and a terminating member 2312. The linear moving element 2330 is displayed in the mode of a cylindrical linear moving shaft 2331 whose length expands/contracts. That is, the linear moving element 2330 has a similar configuration to the linear moving element 1820 (FIG. 8).

As thus described, in the XθY mechanism 2300, the movable section 1811 of the linear moving element 1810 in the X direction as the first element in the XY mechanism (FIG. 8) is replaced by the cylinder of the rotational element 2320 as the second element.

The direction of the linear moving element 2330 is a first local X direction defined by the rotational element 2320. When the position (rotational angle) given to the rotational element 2320 is zero, the first local X direction agrees with the global Y direction.

Figure 14:
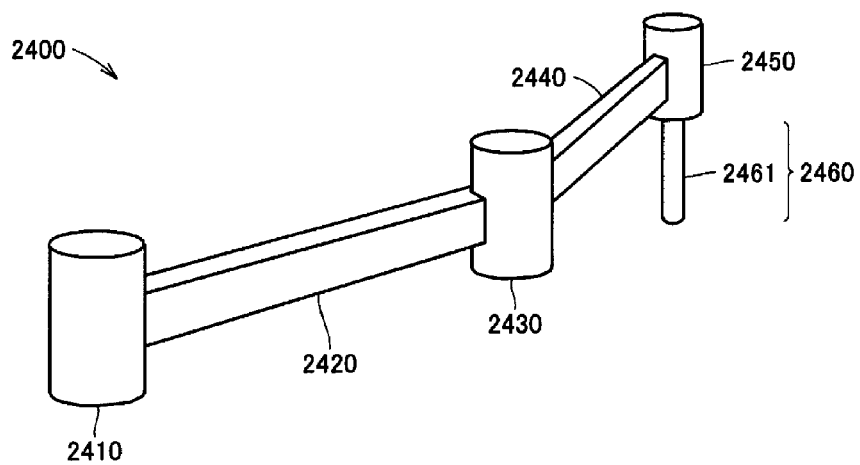
FIG. 14 is a view showing a seventh virtual mechanism.

FIG. 14 is a view showing a seventh virtual mechanism. More specifically, FIG. 14 is a view showing a scalar mechanism 2400. With reference to FIG. 14, the scalar mechanism 2400 includes a rotational element 2410 as the first element, an arm element 2420 as the second element, a rotational element 2430 as the third element, an arm element 2440 as the fourth element, a rotational element 2450 as a fifth element, and a linear moving element 2460 as a sixth element.

The rotational element 2410 is a rotational element whose rotational shaft is turned in the Z direction. The rotational element 2410 is connected with the arm element 2420 in the first local X direction defined by the rotational element 2410.

The arm element 2420 is displayed in a prismatic mode having a set length. However, due to interference with display modes of other connected elements, a length of the arm element on the display is displayed shorter than the set length. The core of the display mode of the arm element 2420 is a line segment with a set length, and the prismatic shape is a modified element with respect to the line segment.

The rotational element 2430 is a rotational element whose rotational shaft is turned in the Z direction. The rotational element 2430 defines a second local coordinate. In the second local coordinate, a direction in which the arm element 2420 is connected to the rotational element 2430 changes in accordance with a position (rotational angle) given to the rotational element 2430. When the rotational angle given to the rotational element 2430 is zero, the arm element 2420 is connected to the rotational element 2430 from the negative X direction of the second local coordinate system.

The arm element 2440 is turned in a second local X direction, and connected to the rotational element 2430.

The rotational element 2450 is a rotational element whose rotational shaft is turned in the Z direction. The rotational element 2450 defines a third local coordinate. In the third local coordinate, a direction in which the arm element 2440 is connected to the rotational element 2450 changes in accordance with a position (rotational angle) given to the rotational element 2450. When the rotational angle given to the rotational element 2450 is zero, the arm element 2440 is connected to the rotational element 2450 from the negative X direction of the third local coordinate system.

The linear moving element 2460 is a linear moving element whose shaft direction is turned in the Z direction. More specifically, the linear moving element 2460 is displayed in the mode of a cylindrical linear moving shaft 2461 whose length expands/contracts. FIG. 14 shows a state where the linear moving shaft has expanded in the negative Z direction by being given the negative position.

Figure 15:
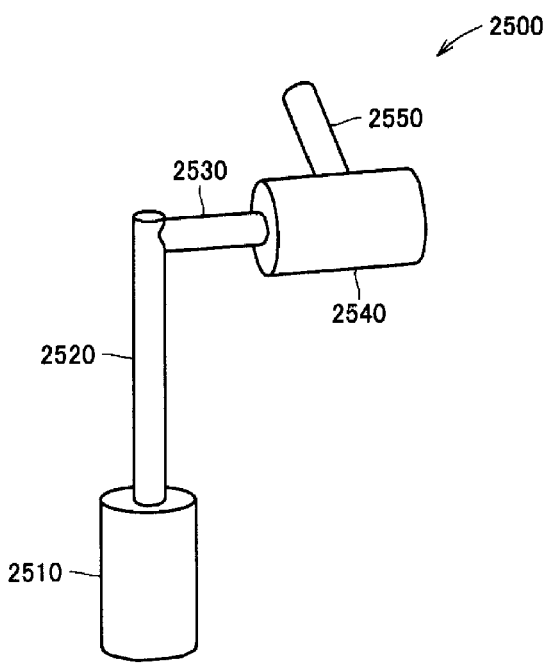
FIG. 15 is a view showing an eighth virtual mechanism.

FIG. 15 is a view showing an eighth virtual mechanism. More specifically, FIG. 15 is a view showing a polar coordinate mechanism 2500. With reference to FIG. 15, the polar coordinate mechanism 2500 includes a rotational element 2510 as the first element, an arm element 2520 as the second element, an arm element 2530 as the third element, a rotational element 2540 as the fourth element, and a linear moving element 2550 as the fifth element.

The rotational element 2510 is a rotational element whose rotational shaft is turned in the Z direction. When the position (rotational angle) given to the rotational element 2510 is zero, the first local X direction agrees with the global X direction.

The arm element 2520 is connected to the rotational element 2510 in the Z direction. The rotational element 2530 is connected to the arm element 2520 in the first local X direction defined by the rotational element 2510. The rotational element 2540 is connected to the arm element 2530 with the rotational shaft turned in the first local X direction. When the position (rotational angle) given to the rotational element 2540 is zero, the second local X direction agrees with the first local Y direction. The rotational element 2550 is a linear moving element connected to the rotational element 2540 in the second local X direction defined by the rotational element 2540.

Other than the virtual mechanisms illustrated above, the virtual mechanism library 1111 may, for example, include a single-shaft linear moving mechanism made up of only one linear moving element or a single-shaft rotational mechanism made up of only one rotational element.

Figure 16:
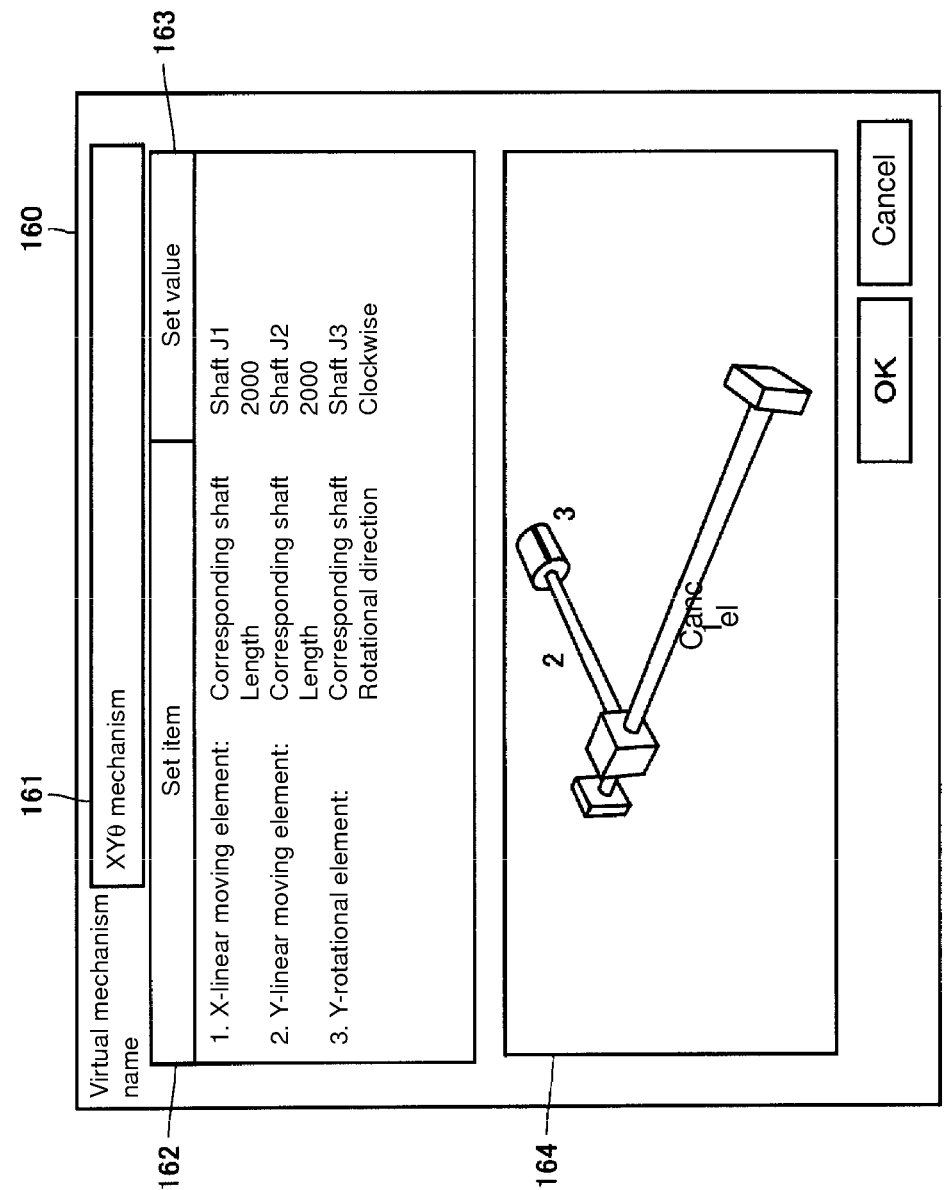
FIG. 16 is a view showing a window for setting the virtual mechanism.

FIG. 16 is a view showing a window 140 for setting the virtual mechanism. More specifically, FIG. 16 is the window 140, which is newly opened when the selection of the virtual mechanism is confirmed in the window 130 (FIG. 7) for selecting the virtual mechanism. The PC 10 displays a name of the selected virtual mechanism in a field 161 for a virtual mechanism name. The PC 10 displays an item settable in the virtual mechanism in a field 162 for a set item. The PC 10 accepts from the user an input of the setting contents in the field 163 for a set value. The PC 10 corrects the set value by the input.

The PC 10 displays an outer view of the selected virtual mechanism in a field 164 in the lower part of the screen. The PC 10 displays numeral "1" showing the first element, numeral "2" showing the second element, and numeral "3" showing the third element. The numeral is also displayed in front of the mechanism element name in the field 162 for a set item. A "shaft J1", a "shaft J2" and a "shaft J3" in the field 163 for a set value are parameters for distinguishing and displaying motors. Also in the control program, the same parameter is used for displaying each motor.

It is to be noted that in the PC 10, a rotating direction of a default of the rotational element is counterclockwise, but the rotating direction may be changed to be clockwise as shown in the figure.

Figure 17:
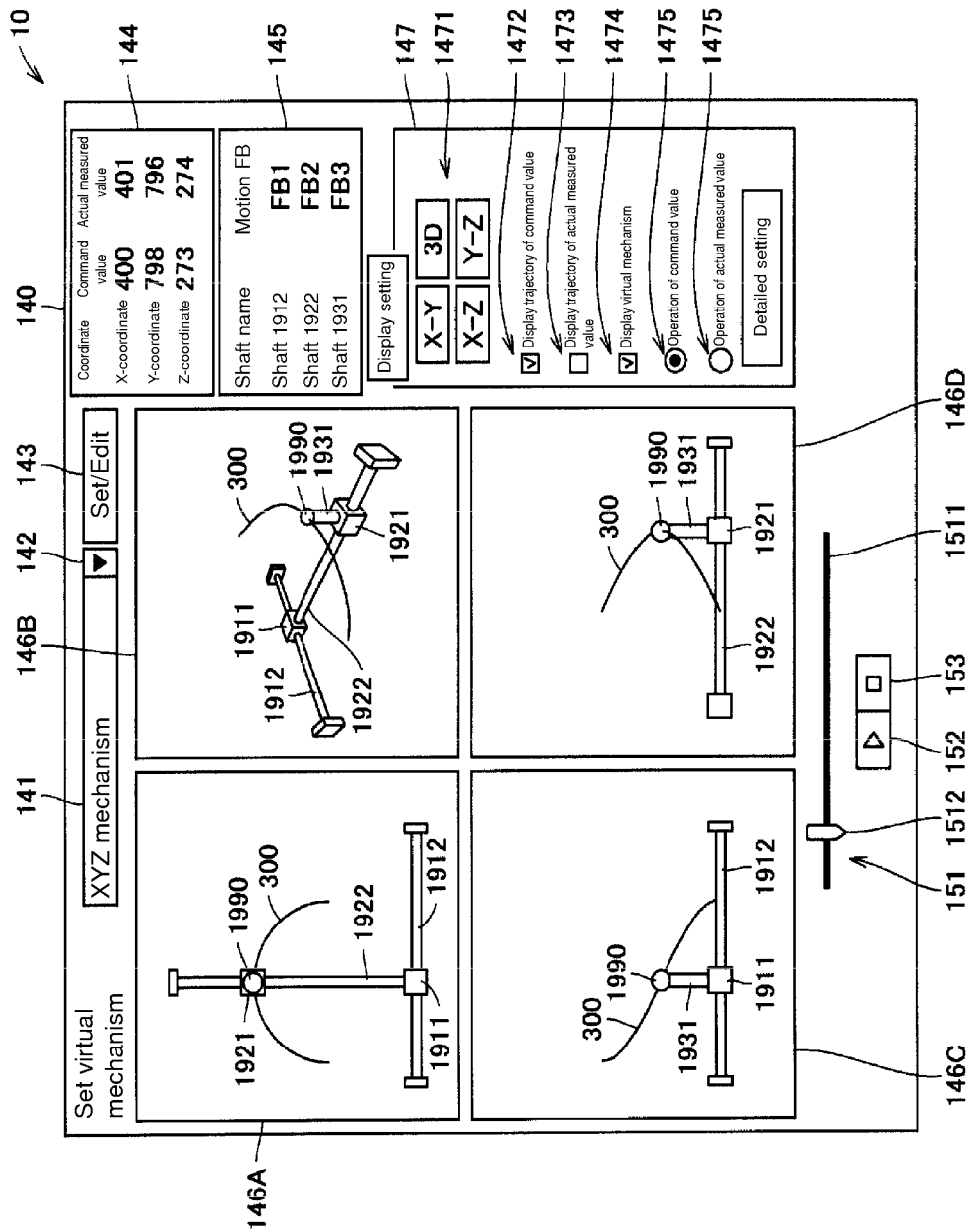
FIG. 17 is a view showing a window in which the virtual mechanism and a trajectory of a specific portion are displayed.

FIG. 17 is a view showing the window 140 in which a virtual mechanism and a trajectory of a specific portion are displayed. Specifically, FIG. 17 is a view showing the window 140 that is opened when the image display link region 123 of FIG. 6 is clicked. Further, FIG. 17 shows an image outputted to the screen of the PC 10 by execution of the PLC support program 11.

The window 140 includes a region 141 showing a name of the virtual mechanism currently in use, a triangular mark 142, a button 143 showing setting and editing, a region 144 showing a coordinate value, a region 145 showing correspondence of the shaft and a motion FB (Function Block), target image display regions 146A, 146B, 146C, 146D, a display setting region 147, a play slide bar 151, a play button 152, and a stop button 153. The play slide bar 151 includes a play time bar 1511 and a current time tab 1512.

The PC 10 displays the region 141 showing a name of the virtual mechanism currently in use, the triangular mark 142, and the button 143 showing setting and editing in the upper part within the window 140. The PC 10 displays the play slide bar 151, the play button 152, and the stop button 153 in the lower part within the window 140.

The PC 10 displays a list of virtual mechanisms when the user selects the triangular mark 142. The PC 10 changes the virtual mechanism currently in use to the selected virtual mechanism by the user selecting an item included in the displayed list. When the button 143 for setting and editing is pushed by the user, the PC 10 opens a virtual mechanism setting screen as another window. The PC 10 displays a current value of the command value for every coordinate shaft in the region 144 showing the coordinate value.

The PC 10 displays a correspondence relationship of the shaft name and the motion FB name used in the control program 12 in the region 145 showing the correspondence of the shaft and the motion FB. The motion FB is a program element used in the control program 12. Specifically, the motion FB is a motion program subjected to blocking for every basic unit of such an operation as a movement from one point to another point. The motion FB calculates a command value in every control period. The PC 10 displays the currently operating motion FB in the region 145 showing the correspondence of the shaft and the motion FB.

The PC 10 displays a projection diagram of the XYZ mechanism 1900 and a trajectory 300 with respect to the XY plane formed by two orthogonal coordinate axes X, Y in the target image display region 146A. The PC 10 displays a 3D image of the XYZ mechanism 1900 and the trajectory 300 in the target image display region 1468. The PC 10 displays a projection diagram of the XYZ mechanism 1900 and the trajectory 300 with respect to the XZ plane formed by two orthogonal coordinate axes X, Z in the target image display region 146C. The PC 10 displays a projection diagram of the XYZ mechanism 1900 and the trajectory 300 with respect to the YZ plane formed by two orthogonal coordinate axes Y, Z in the target image display region 146D.

The PC 10 displays each button 1471 indicating a corresponding display method ("3D", "X-Y", "X-Z", "Y-Z") in the display setting region 147 so as to be in an arrangement corresponding to the respective position relationship of the target image display regions 146A, 1468, 146C, 146D. The PC 10 changes the arrangement of each of the target image display regions 146A to 146D when accepting an instruction to change the arrangement of the four buttons 1471 from the user. When accepting from the user an instruction that the user select any one of the buttons 1471, the PC 10 expands and displays a target image display region corresponding to the selected button.

The 3D display is drawn by a perspective view method. The PC 10 changes a position of a view point and a viewing direction within the three-dimensional space in accordance with a mouse operation of the user.

The PC 10 can change a display magnification of display contents in each of the target image display regions 146A to 146D. The PC 10 can also scroll-move the display contents up and down, and left and right.

The PC 10 displays the XYZ mechanism 1900 in each of the target image display regions 146A to 146D. More Specifically, the PC 10 displays the trajectory 300 (trajectory of command value of the position in the embodiment) of the specific portion of the control target device 30 and the XYZ mechanism 1900 in an overlapping manner in each of the target image display regions 146A to 146D. It is to be noted that in FIG. 17, the trajectory 300 is shown with a curve. The PC 10 displays a current position marker 1990 indicating the current position at the distal end 1931A of the linear moving element 1930 in the Z direction. In FIG. 17, the current position marker 1990 is shown with a small sphere. The trajectory 300 displayed by the PC 10 is a trajectory that draws a semicircle as a projection to the XY coordinate plane while rising in the Z direction.

Other than the arrangement of each of the foregoing target image display regions 146A to 146D, the PC 10 displays in the display setting region 147 a checkbox 1472 for enabling the user to select whether or not to display the trajectory 300 of the command value, a checkbox 1473 for enabling the user to select whether or not to display the trajectory 300 of the actual measured value, and a checkbox 1474 for enabling the user to select whether or not to display the XYZ mechanism 1900.

When the XYZ mechanism 1900 is displayed, the PC 10 displays in the display setting region 147 a radio button 1475 that accepts a selection as to whether to operate the XYZ mechanism 1900 in accordance with the command value or operate the XYZ mechanism 1900 in accordance with the actual measured value.

The PC 10 displays only the trajectory 300 when not displaying the XYZ mechanism 1900. Further, the PC 10 may display only the trajectory 300 and the current position marker 1990 when not displaying the XYZ mechanism 1900. When the user pushes a detailed setting button, the PC 10 displays an operation screen to perform setting of a thickness of the trajectory, setting of a display color of the trajectory, setting of displays of the coordinate shaft and the coordinate numerical value, and the like.

The play time bar 1511 shows the time required to execute the control program 12 from the beginning to the end. The PC 10 moves the current time tab 1512 from the left to the right on the play time bar 1511 in accordance with the lapse of time for executing the control program 12. The PC 10 changes the display beginning time of the moving image when the user drag-operates the current time tab 1512 with the mouse.

When the user pushes the play button 152, the PC 10 begins a display of the moving image. When the user pushes the stop button 153, the PC 10 stops the display of the moving image.

When beginning the display of the moving image, the PC 10 displays a state where each mechanism element moves and the current position marker 1990 moves along the trajectory. The PC 10 draws the XYZ mechanism 1900 of the same time as each other in each of the target image display regions 146A to 146D, and synchronizes the movement of the XYZ mechanism 1900 displayed in each of the target image display regions 146A to 146D with each other.

Each sequentially displayed still image constituting the moving image is one that draws the trajectory and the XYZ mechanism 1900 for the control period extracted at a constant interval. As an example, the moving image is assumed to be configured by a sequence of still images displayed 60 frames per second, that is, at 16.7-ms interval, where the control period is 167 μs. In this case, the PC 10 can display the virtual mechanism that moves at the same speed as the actual control target device 30 by creating and sequentially displaying the still image corresponding to the control period in every 100 control periods. The control period to create the still image is not necessarily limited to a constant interval. Particularly in a case where the desired speed on the display cannot be realized once in every integer times of control periods, the PC 10 may fine tune the interval of the control period to create the still image every time so as to averagely achieve the desired speed on the display.

When the PC 10 is configured so as to accept the user operation for changing the interval of the control period to create the still image, the user can freely make the operation speed of the control target device 30 on the display faster or slower. When the PC 10 is configured so as to sequentially display the still images in all the control periods, the user can observe the movement of the virtual mechanism in detail at slow motion.

Figure 18:
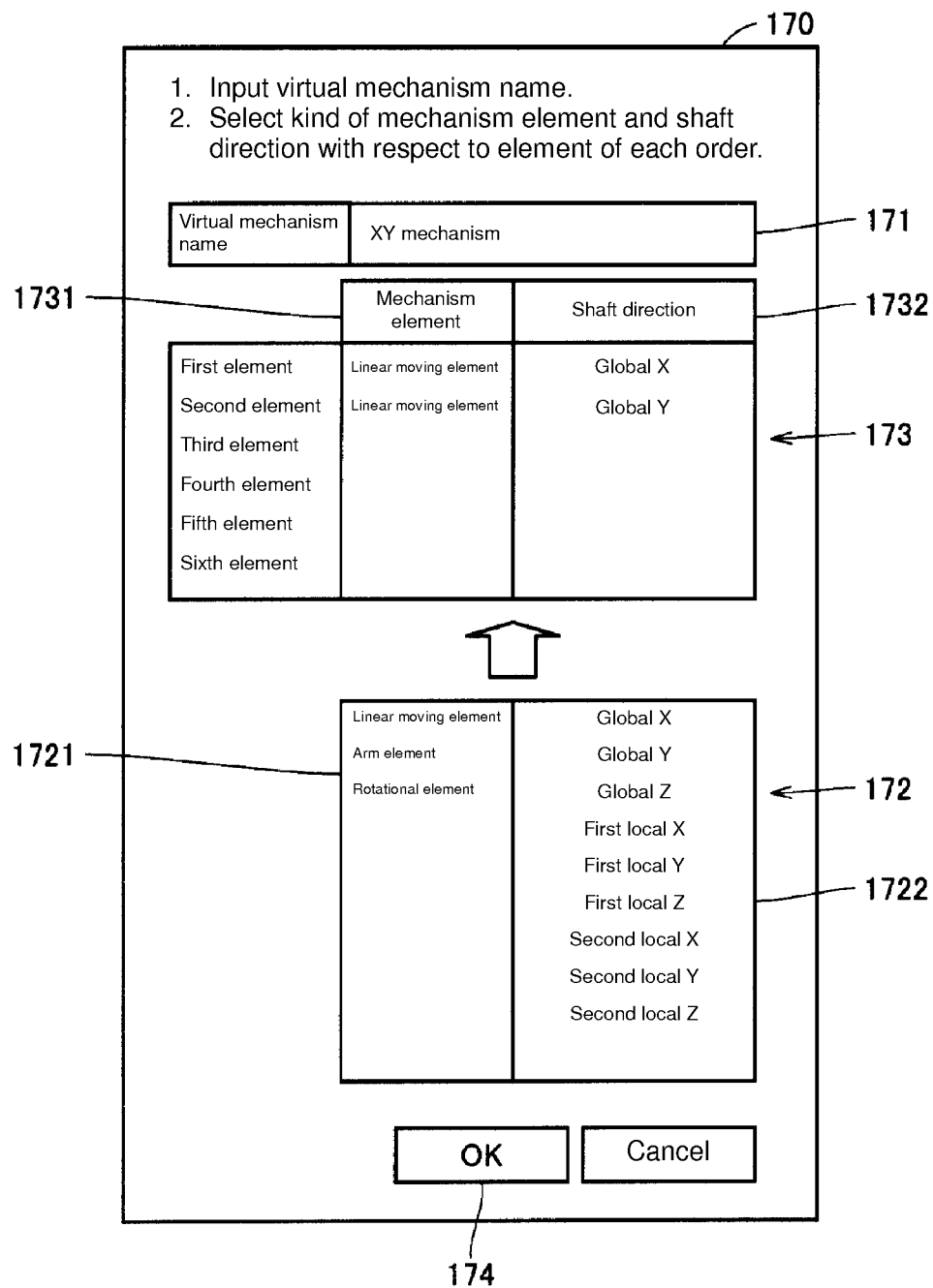
FIG. 18 is a view showing a window for newly creating a virtual mechanism.

FIG. 18 is a view showing a window 170 for newly creating a virtual mechanism. Specifically, FIG. 18 is a view showing a window displayed when the selection of the region 1312 of "new creation" is confirmed in the window 130 for selecting the virtual mechanism which is shown in FIG. 7.

With reference to FIG. 18, the window 170 includes a field 171 for a virtual mechanism name, a list 172, a creation field 173 showing an element of the virtual mechanism to be created, and an OK button 174 for accepting an instruction to complete creation of the virtual mechanism.

The list 172 is configured of a field 1721 showing options of a mechanism element, and a field 1722 showing options of a shaft direction. The creation field 173 includes a field 1731 for designating a mechanism element and a field 1732 for specifying a shaft direction.

The PC 10 enables the user to input a name of a virtual mechanism to be newly created in the field 171 for a virtual mechanism name. It is to be noted that FIG. 18 shows an example of the case of newly creating the XY mechanism.

Next, the PC 10 specifies the kind of the mechanism element and the shaft direction in association with the element of each order. The specification is performed by a drag-and-drop operation from the list 172 in the lower part of the screen.

Since there is the relationship in which the second element depends on the first element and the third element depends on the second element, the operation for specifying the mechanism element in association with the element of each order is a specifying operation as to which mechanism element is to be connected to and interlocked with which mechanism element.

The user pushes the OK button 174 when the definition input of the virtual mechanism is completed. The virtual mechanism managing section 112 (FIG. 3) then adds the newly defined virtual mechanism to the virtual mechanism library 1111.

FIG. 19 is a view showing definition information of each of the virtual mechanisms exemplified in FIGS. 8 to 15. Each of the definition information shows the correspondence relationship of the mechanism element corresponding to the element of each order and the shaft direction. Referring to these examples can facilitate definition of a variety of virtual mechanisms other than the virtual mechanisms concretely shown above.

Some of the configurations, functions, and the like of the PC 10 described above can be summarized as below.

(1) The PC 10 is provided with the storage device storing the virtual mechanism library 1111, the virtual mechanism presenting section 1121, the virtual mechanism accepting section 1122, the acquirement section 1131, the moving image data creating section 1132, and the display controlling section 1133. The virtual mechanism library 1111 does not necessarily need to be built in the PC 10, and for example, the virtual mechanism library 1111 may be provided in the server device 40 and used from the PC 10 through the network 50. At least part of the virtual mechanism contained in the virtual mechanism library 1111 includes a structure in which a plurality of mechanism elements are combined having interlocking relationships. The virtual mechanism includes an abstracted mode not imitating a mode of a specific control target device that can be associated with the virtual mechanism when the virtual mechanism is used by the user. The virtual mechanism presenting section 1121 presents options of the virtual mechanism included in the virtual mechanism library 1111 to the user. The virtual mechanism presenting section 1121 presents at least a plurality of options of virtual mechanisms which are different in kind of the mechanism element or in mode of the interlocking relationship among the mechanism elements. The virtual mechanism accepting section 1122 accepts one selection among the options of the virtual mechanism presented by the virtual mechanism presenting section 1121. The acquirement section 1131 acquires command values of a sequence of positions or actual measured values of a sequence of positions as the execution results of the control program. The moving image data creating section 1132 creates moving image data showing a state of the selected virtual mechanism in every control period or in a plurality of specified control periods by use of the acquired command values of the positions or the actual measured values of the positions. The PC 10 includes the display controlling section 1133 that displays a moving image on the screen by use of the moving image data.

According to the above configuration, when the user selects a virtual mechanism whose drive structure (kind of the mechanism element or form of the interlocking relationship among the mechanism elements) agrees with a drive structure of the control target device 30, the motion of the control target device 30 can be made understood by the user through the display of the moving image of the virtual mechanism. Particularly in the case of such an application as to test whether the control program for controlling the motion of the control target device 30 operates as intended, there is no significant harm in the actual outer view of the control target device 30 being different from the outer view of the virtual mechanism. Further, in the case of the above application, it is often sufficient therefor so long as the user can see the motion of the virtual mechanism in the abstracted mode which is common in a large number of models of the control target device 30. Therefore, the use of the PC 10 eliminates the need for the user to create a three-dimensional model reproducing the outer view of each control target device 30. Further, the use of the PC 10 can make the user understand the motion of the control target device 30 to a sufficient degree for such a target as to verify the program.

(2) The virtual mechanism presenting section 1121 presents at least options of a virtual mechanism having a linear moving element as the mechanism element. The linear moving element has a columnar linear moving shaft and a movable section that moves along the linear moving shaft. The linear moving element is displayed in a mode where a length of the linear moving shaft remains unchanged from the beginning to the end of reproduction of at least one moving image.

The linear moving element with the above configuration is in the mode of abstracting an actual linear moving element such as a linear moving stage where a movable section moves in a constant length range. This facilitates the user to understand the motion of the actual linear moving element.

The moving image data creating section 1132 may decide the mode in display of the linear moving element, especially the length of the linear moving shaft, before the beginning of creation of the moving image such that the motion of the linear moving element can be displayed from the beginning to the end of reproduction of at least one moving image. This is possible by the moving image data creating section 1132 checking the range of the command value or the actual measured value used for creation of the moving image data before the beginning of creation of the moving image data. In such a manner, essential setting information on the mode of the linear moving element to be inputted by the user can also be made nonexistent in order to make the virtual mechanism available.

Further, the moving image data creating section 1132 may decide the mode in display of the linear moving element such that the linear moving shaft has an initial length before the beginning of creation of the moving image, and when the position of the movable section exceeds the range of the position made displayable by the initial length in progress of creation of the moving image, the moving image data creating section 1132 may change the length of the linear moving shaft to such a length as to make the position of the movable section displayable during the image moving. Also by use of the moving image data creating section 1132 as above, essential setting information on the mode of the linear moving element to be inputted by the user can be made nonexistent in order to make the virtual mechanism available.

(3) The virtual mechanism accepting section 1122 further accepts an input for setting the mode of the virtual mechanism. The input, accepted by the virtual mechanism accepting section 1122 for the linear moving element as an essential input for making available the virtual mechanism including the linear moving element, is only an input for setting the movable length of the movable section.

Accordingly, as for the mode of the linear moving element, the user can use the virtual mechanism by setting at least the movable length.

(4) The virtual mechanism presenting section 1121 presents at least options of a virtual mechanism having a linear moving element as the mechanism element. The linear moving element has a columnar linear moving shaft. The linear moving element is displayed in the mode of changing the length of the linear moving shaft in accordance with a change in command value or actual measured value.

The above linear moving element is the mode formed by abstracting an actual linear moving element such as a piston-cylinder mechanism or a rack-and-pinion mechanism in which the length from the basal end or the fixed section to the distal end changes. This facilitates the user to understand the motion of the actual linear moving element.

In this case, the PC 10 may prevent an input of an upper limit for the range of the change in length of the linear moving shaft from being required or may allow the input not to be made. In such a manner, essential setting information on the mode of the linear moving element to be inputted by the user can be made nonexistent in order to make the virtual mechanism available.

(5) The virtual mechanism presenting section 1121 presents at least options of a virtual mechanism having a rotational element as the mechanism element. The rotational element is a columnar body that rotates about an axis of symmetry.

The above rotational element is in the mode of abstracting an actual rotational element such as a motor or a rotational shaft. This facilitates the user to understand the motion of the actual linear moving element.

(6) The virtual mechanism presenting section 1121 presents at least options of a virtual mechanism having two linear moving elements perpendicularly connected to each other as the mechanism element and a virtual mechanism having three linear moving elements perpendicularly connected to each other as the mechanism element.

There actually exist in large number a virtual mechanism (e.g., XY mechanism) having two linear moving elements perpendicularly connected to each other as the mechanism element or a virtual mechanism having three linear moving elements perpendicularly connected to each other as the mechanism element. For this reason, the general versatility of the PC 10 can be enhanced when the virtual mechanism library 1111 is provided with these two kinds of virtual mechanisms as options.

(7) The PC 10 further includes the storage device storing the mechanism element library 1112, the mechanism element presenting section 1123, the mechanism element accepting section 1124, the virtual mechanism creating section 1125 and the virtual mechanism registering section 1126. The mechanism element library contains at least one mechanism element. In the case of defining a new virtual mechanism, the mechanism element presenting section 1123 displays, on the screens, options of the mechanism element included in the mechanism element library 1112 and available for definition of the virtual mechanism. The mechanism element accepting section 1124 accepts a selection of mechanism elements connected to each other among the mechanism elements presented as the options, and specification of the form of interlock between the selected mechanism elements. The virtual mechanism creating section 1125 creates a virtual mechanism which includes the above selected mechanism elements and where the mechanism elements are interlocked in the above specified mode. The virtual mechanism registering section 1126 registers the created virtual mechanism in the library 111.

Therefore, when the PC 10 does not provide as an option a virtual mechanism having a mechanism element configuration agreeing with a mechanism element configuration of the control target device 30 of the user, the user can create and use his or her own required virtual mechanism.

It is to be noted that, although the feeling of reality is reduced, the actual linear moving element whose length from the basal end or the fixed section to the distal end changes may be represented by the foregoing virtual linear moving element having a linear moving shaft with a constant length, according to circumstances. Further, on the contrary, a linear moving element whose length remains unchanged may be represented by use of the virtual linear moving element whose length from the basal end or the fixed section to the distal end changes.

The embodiments disclosed herein are illustrative, and should not be limited only by the contents described above. The scope of the present invention is defined by the Claims, where meanings equivalent to the Claims and all modifications within the scope of the Claims are intended to be encompassed therein.

DESCRIPTION OF SYMBOLS

1 control system, 11 PLC support program, 12 control program, 21 control program, 30 control target device, 40 server device, 50 network, 101 user interface unit, 102 PLC interface unit, 103 control program editing unit, 104 control program simulation unit, 105 moving image creating program unit, 111 library, 112 virtual mechanism managing section, 113 moving image data processing section, 120/130/140/170 window, 121 setting region, 122 control program editing region, 123 image display link region, 300 trajectory, 1012 accepting section, 1111 virtual mechanism library, 1112 mechanism element library, 1121 virtual mechanism presenting section, 1122 virtual mechanism accepting section, 1123 mechanism element presenting section, 1124 mechanism element accepting section, 1125 virtual mechanism creating section, 1126 virtual mechanism registering section, 1131 acquirement section, 1132 moving image data creating section, 1133 display controlling section, 1800 XY mechanism, 1900 XYZ mechanism, 1990 current position marker, 2000 XYθ mechanism, 2100 XYZθ mechanism, 2200 θXY mechanism, 2300 XθY mechanism, 2400 scalar mechanism, 2500 polar coordinate mechanism

The invention claimed is:

1. A display device for displaying on a screen an operation of a control target device which is operated by an input of a command value of a position outputted by execution of a control program in a predefined period, as a moving image of a virtual mechanism, the virtual mechanism being an electronically constructed three-dimensional model, the device comprising:
a plurality of functional sections, running on at least one processor, including:
a virtual mechanism presenting section configured for presenting options of a virtual mechanism on the screen;
a virtual mechanism accepting section configured for accepting one selection of the virtual mechanism out of the options of the virtual mechanism presented by the virtual mechanism presenting section;
an acquirement section configured for acquiring command values of a sequence of positions or actual measured values of a sequence of positions as execution results of the control program;
a moving image data creating section configured for creating moving image data showing a state of the selected virtual mechanism in every period or in a plurality of predefined periods by use of the acquired command values of the positions or the actual measured values of the positions; and
a display controlling section configured for displaying a moving image on the screen by use of the moving image data,
wherein the virtual mechanism includes a structure in which a plurality of mechanism elements are combined having interlocking relationships,
the virtual mechanism presenting section presents at least a plurality of options of virtual mechanisms which are mutually different in kind of the mechanism element or in form of the interlocking relationship among the mechanism elements, and
the virtual mechanism includes an abstracted mode not imitating a mode of a specific control target device that can be associated with the virtual mechanism when the virtual mechanism is used by a user, wherein the virtual mechanism presenting section presents at least options of a virtual mechanism having a linear moving element as the mechanism element, the linear moving element has a columnar linear moving shaft and a movable section that moves along the linear moving shaft, and the linear moving element is displayed in a mode where a length of the linear moving shaft remains unchanged from the beginning to the end of reproduction of at least one moving image.

2. The display device according to claim 1, wherein
the virtual mechanism accepting section further accepts an input for setting a mode of the mechanical element, and
the input, accepted by the virtual mechanism accepting section for the linear moving element as an essential input for making available the virtual mechanism including the linear moving element, is only an input for setting a movable length of the movable section.

3. The display device according to claim 1, wherein
the virtual mechanism presenting section presents at least options of a virtual mechanism having a linear moving element as the mechanism element,
the linear moving element has a columnar linear moving shaft, and
the linear moving element is displayed in the mode of changing the length of the linear moving shaft in accordance with a change in the command value or the actual measured value.

4. The display device according to claim 1, wherein
the virtual mechanism presenting section presents at least options of a virtual mechanism having a rotational element as the mechanism element, and
the rotational element is a columnar body that rotates about an axis of symmetry.

5. The display device according to claim 1, wherein the virtual mechanism presenting section presents at least options of a virtual mechanism having two linear moving elements perpendicularly connected to each other as the mechanism element and a virtual mechanism having three linear moving elements perpendicularly connected to each other as the mechanism element.

6. The display device according to claim 1, further comprising:
a mechanism element presenting section configured for presenting on the screen options of a mechanism element available for definition of the virtual mechanism;
a mechanism element accepting section configured for accepting a selection of mechanism elements connected to each other among the mechanism elements presented as the options, and a specification of an interlocking mode of the selected mechanism elements; and
a virtual mechanism creating section configured for creating a virtual mechanism which includes the selected mechanism elements and in which the mechanism elements interlock in a specified form.

7. The display device according to claim 1, further comprising
a storage device that stores a virtual mechanism library including a plurality of mutually different virtual mechanisms,
wherein the virtual mechanism presenting section presents options of the virtual mechanism included in the virtual mechanism library.

8. The display device according to claim 6, further comprising:
a storage device that stores a virtual mechanism library including a plurality of mutually different virtual mechanisms and a mechanism element library including at least one mechanism element; and
a virtual mechanism registering section configured for registering the virtual mechanism created by the virtual mechanism creating section in the virtual mechanism library, wherein
the virtual mechanism presenting section presents options of the virtual mechanism included in the virtual mechanism library, and
the mechanism element presenting section presents options of the mechanism element included in the mechanism element library.

9. A display method for displaying on a screen of a display device an operation of a control target device which is operated by an input of a command value of a position outputted by execution of a control program in a predefined period, as a moving image of a virtual mechanism, the virtual mechanism being an electronically constructed three-dimensional model, the method comprising:
a step of presenting options of a virtual mechanism on the screen by a processor of the display device;
a step of accepting one selection of the virtual mechanism out of the options of the presented virtual mechanism by the processor;
a step of acquiring command values of a sequence of positions or actual measured values of a sequence of positions as execution results of the control program by the processor;
a step of creating moving image data showing a state of the selected virtual mechanism in every period or in a plurality of predefined periods by use of the acquired command values of the positions or the actual measured values of the positions by the processor; and
a step of displaying a moving image on the screen by use of the moving image data by the processor,
wherein the virtual mechanism includes a structure in which a plurality of mechanism elements are combined having interlocking relationships,
in the step of presenting options of the virtual mechanism on the screen, the processor presents at least a plurality of options of virtual mechanisms which are mutually different in kind of the mechanism element or in form of the interlocking relationship among the mechanism elements, and
the virtual mechanism includes an abstracted mode not imitating a mode of a specific control target device that can be associated with the virtual mechanism when the virtual mechanism is used by a user, wherein a virtual mechanism presenting section presents at least options of the virtual mechanism having a linear moving element as the mechanism element, the linear moving element has a columnar linear moving shaft and a movable section that moves along the linear moving shaft, and the linear moving element is displayed in a mode where a length of the linear moving shaft remains unchanged from the beginning to the end of reproduction of at least one moving image.

10. A computer readable non-transitory recording medium storing a program for making an operation of a control target device displayed on a screen of a display device, the operation being operated by an input of a command value of a position outputted by execution of a control program in a predefined period, as a moving image of a virtual mechanism, the virtual mechanism being an electronically constructed three-dimensional model, the program making the display device execute:
a step of presenting options of a virtual mechanism on the screen;
a step of accepting one selection of the virtual mechanism out of the options of the presented virtual mechanism;
a step of acquiring command values of a sequence of positions or actual measured values of a sequence of positions as execution results of the control program;
a step of creating moving image data showing a state of the selected virtual mechanism in each period or in a plurality of predefined periods by use of the acquired command values of the positions or the actual measured values of the positions; and
a step of displaying a moving image on the screen by use of the moving image data, wherein
the virtual mechanism includes a structure in which a plurality of mechanism elements are combined having interlocking relationships,
in the step of presenting options of the virtual mechanism on the screen, at least a plurality of options of virtual mechanisms are presented which are mutually different in kind of the mechanism element or in form of the interlocking relationship among the mechanism elements, and
the virtual mechanism includes an abstracted mode not imitating a mode of a specific control target device that can be associated with the virtual mechanism when the virtual mechanism is used by a user, wherein a virtual mechanism presenting section presents at least options of the virtual mechanism having a linear moving element as the mechanism element, the linear moving element has a columnar linear moving shaft and a movable section that moves along the linear moving shaft, and the linear moving element is displayed in a mode where a length of the linear moving shaft remains unchanged from the beginning to the end of reproduction of at least one moving image.

11. A computer readable non-transitory recording medium storing a virtual mechanism library, which contains a virtual mechanism as an electronically constructed three-dimensional model, and by execution of a control program using a processor to:
present, using a virtual mechanism presenting section, options of the virtual mechanism on a screen;
wherein the virtual mechanism includes a structure in which a plurality of mechanism elements are combined having interlocking relationships,
the virtual mechanism library contains at least a plurality of virtual mechanisms which are mutually different in kind of the mechanism element or in form of the interlocking relationship among the mechanism elements, and
the virtual mechanism includes an abstracted mode not imitating a mode of a specific control target device that can be associated with the virtual mechanism when the virtual mechanism is used by a user, wherein the virtual mechanism presenting section presents at least options of the virtual mechanism having a linear moving element as the mechanism element, the linear moving element has a columnar linear moving shaft and a movable section that moves along the linear moving shaft, and the linear moving element is displayed in a mode where a length of the linear moving shaft remains unchanged from the beginning to the end of reproduction of at least one moving image.

12. The virtual mechanism library according to claim 11, wherein the library at least contains a virtual mechanism having two linear moving elements perpendicularly connected to each other as the mechanism element and a virtual mechanism having three linear moving elements perpendicularly connected to each other as the mechanism element.

* * * * *